(12) United States Patent
Soto

(10) Patent No.: US 11,536,155 B2
(45) Date of Patent: Dec. 27, 2022

(54) APPARATUS, SYSTEMS, AND METHODS FOR WIRELESS MONITORING OF GAS TURBINE ENGINE TEMPERATURE

(71) Applicant: SENSATEK PROPULSION TECHNOLOGY, INC., Daytona Beach, FL (US)

(72) Inventor: Reamonn Soto, Daytona Beach, FL (US)

(73) Assignee: SENSATEK PROPULSION TECHNOLOGY, INC., Daytona Beach, FL (US)

(*) Notice: Subject to any disclaimer, the term of this patent is extended or adjusted under 35 U.S.C. 154(b) by 217 days.

(21) Appl. No.: 16/765,540

(22) PCT Filed: Nov. 20, 2018

(86) PCT No.: PCT/US2018/062144
§ 371 (c)(1),
(2) Date: May 20, 2020

(87) PCT Pub. No.: WO2019/100082
PCT Pub. Date: May 23, 2019

(65) Prior Publication Data
US 2020/0308978 A1    Oct. 1, 2020

Related U.S. Application Data

(60) Provisional application No. 62/588,765, filed on Nov. 20, 2017.

(51) Int. Cl.
*F01D 17/08*        (2006.01)
*G01K 13/02*        (2021.01)
(Continued)

(52) U.S. Cl.
CPC .......... *F01D 17/085* (2013.01); *F01D 5/288* (2013.01); *G01K 1/024* (2013.01); *G01K 13/02* (2013.01);
(Continued)

(58) Field of Classification Search
CPC ....... F01D 17/085; F01D 5/288; G01K 1/024; G01K 13/02; G01K 13/08; G01K 13/024;
(Continued)

(56) References Cited

U.S. PATENT DOCUMENTS 4,055,705 A * 10/1977 Stecura ............... C23C 28/3215
427/454
8,558,705 B2 * 10/2013 Gong ..................... G01N 22/02
29/595

(Continued)

OTHER PUBLICATIONS

International Search Report, dated Jul. 12, 2021.
International Search Report, dated Mar. 28, 2019.

*Primary Examiner* — Nathaniel T Woodward
*Assistant Examiner* — Philip L Cotey
(74) *Attorney, Agent, or Firm* — Terry M. Sanks, Esq.; Beusse Sanks, PLLC

(57) ABSTRACT

A system for wirelessly monitoring temperatures of a gas turbine engine comprising a wireless sensor positioned on or in a component of the engine, one or more interrogating antennas capable of transmitting an RF signal to the wireless sensor and receiving an RF return signal from the wireless sensor, and a processing unit capable of interpreting the RF return signal to determine a temperature of the component inside the engine. In an embodiment, the wireless sensor comprises polymer derived ceramics ("PDC") deposited on an Inconel surface of the engine. In an embodiment, the wireless sensor sustains temperatures up to 1000° C. during long term operation of the part of the engine. In an embodiment, the wireless sensor comprises multiple layers includ- (Continued)

ing a metallic patch antenna, a PDC layer, and a bond coat which provides a metallic ground plane for the sensor.

18 Claims, 13 Drawing Sheets

(51) Int. Cl.
*F01D 5/28* (2006.01)
*G01K 1/024* (2021.01)
*G01K 13/08* (2006.01)
*H04B 7/0456* (2017.01)
*H01Q 9/04* (2006.01)
*H01Q 1/22* (2006.01)
*G01K 13/024* (2021.01)

(52) U.S. Cl.
CPC ........... *G01K 13/08* (2013.01); *H01Q 1/2208* (2013.01); *H01Q 9/0407* (2013.01); *H04B 7/0469* (2013.01); *F05D 2300/6033* (2013.01); *G01K 13/024* (2021.01)

(58) Field of Classification Search
CPC .. H01Q 1/2208; H01Q 9/0407; H04B 7/0469; F05D 2300/6033
See application file for complete search history.

(56) References Cited

U.S. PATENT DOCUMENTS

| | | | |
|---|---|---|---|
| 2009/0188324 A1* | 7/2009 | Gregory | G01B 7/16 73/773 |
| 2010/0117859 A1* | 5/2010 | Mitchell | F01D 21/003 340/870.16 |
| 2010/0321191 A1* | 12/2010 | Gong | G01L 9/0075 430/319 |
| 2011/0133950 A1* | 6/2011 | Subramanian | F23R 3/00 340/870.28 |
| 2011/0280279 A1* | 11/2011 | Gregory | G01K 7/32 374/152 |
| 2015/0028889 A1* | 1/2015 | Gong | G01K 7/343 324/633 |
| 2017/0175553 A1* | 6/2017 | Burbaum | B32B 15/01 |
| 2017/0190628 A1* | 7/2017 | Easter | C04B 35/76 |

\* cited by examiner

APPARATUS, SYSTEMS, AND METHODS FOR WIRELESS MONITORING OF GAS TURBINE ENGINE TEMPERATURE

This application claims priority to U.S. Provisional Patent Application No. 62/588,765, filed Nov. 20, 2017, entitled "APPARATUS, SYSTEMS, AND METHODS FOR WIRELESS MONITORING OF GAS TURBINE ENGINE TEMPERATURE," the entire disclosure of which is incorporated herein by reference. This application includes material which is subject to copyright protection. The copyright owner has no objection to the facsimile reproduction by anyone of the patent disclosure, as it appears in the Patent and Trademark office files or records, but otherwise reserves all copyright rights whatsoever.

BRIEF SUMMARY OF THE INVENTION

In an aspect of an embodiment of the invention, a system is provided for wireless monitoring of a gas turbine engine. In an embodiment, the system comprises at least one sensing antenna installed inside a gas turbine engine, an interrogating antenna capable of transmitting and receiving a wireless signal from the sensing antenna, and a processing unit capable of interpreting the signal to determine a temperature of a component inside the engine. In an embodiment, the sensing antenna is installed on a blade of the engine. In an embodiment, the sensing antenna is installed on vane, blade, and/or turbomachinery of the engine. In an embodiment, the sensing antenna comprises polymer derived ceramics ("PDC"). In an embodiment, the sensing antenna is a wireless sensor such as one of the wireless sensors described below. In an embodiment, the sensing antenna is installed under a thermal barrier coating of the blade, directly on the thermal barrier coating of the blade, and installed on the surface of a non-thermal barrier coated blade. In an embodiment, multiple sensing antennas are used to obtain temperatures in multiple areas of the engine. In an embodiment, 1-100 sensing antennas are used. In an embodiment, one or more of the sensing antennas are patch antennas. In an embodiment, the size, geometry, design, or composition of the multiple sensing antennas is varied so that distinct signals from each can be distinguished by the processing unit. In an embodiment, the interrogating antenna is a robust high temperature interrogation antenna installed at least partially inside the engine. In an embodiment, the interrogating antenna is installed through a port within the engine case. In an embodiment, the interrogating antenna is powered to generate wireless signals in the radio frequency ("RF") range. In an embodiment, a wireless signal generated by the interrogating antenna creates a return wireless signal in the RF range when incident upon the sensing antenna. In an embodiment, the interrogating antenna is installed outside the engine casing but the system is configured such that the interrogating antenna can receive the return signal from the sensing antenna installed inside the engine casing. In an embodiment, a portion of the engine casing is transparent to the return signal. In an embodiment, there is a clear line of site available from the interrogating antenna to the sensing antenna. In an embodiment, the system is capable of sensing temperatures that range from 500-1400° C. In an embodiment, the system is capable of sensing temperatures that range from 500-1600° C. In an embodiment, the system is capable of sensing temperatures that range from 650-1800° C. In an embodiment, the system is capable of sensing temperatures with an accuracy of 10° C. In an embodiment, the system is capable of determining temperatures at pressures of 200-600 psi. In an embodiment, the system is capable of determining temperatures in real time. In an embodiment, the system is capable of continuously determining temperatures of components inside the engine while the engine is running and on parts during engine component testing in a testing environment. In an embodiment, the system is capable of continuously determining temperatures inside an operating engine for a period of 1 to 10,000 hours. In an embodiment, the system comprises one or more of the wireless sensors described below. In an embodiment, the system operates by one or more of the methods described below.

In another aspect of an embodiment of the invention, a wireless sensor is provided. In an embodiment, the wireless sensor comprises an antenna such as the sensing antenna described above. In an embodiment, the antenna is a passive antenna that responds to interrogation by another antenna such as one or more of the interrogating antennas described above. In an embodiment, the wireless sensor is capable of being positioned on or in a component inside an engine case of a gas turbine engine. In an embodiment, the wireless sensor is capable of being positioned on or in a blade of the engine. In an embodiment, the sensing wireless sensor is capable of being positioned on or in a vane of the engine. In an embodiment, the wireless sensor comprises PDC. In an embodiment, the wireless sensor is installed under a thermal barrier coating of the blade. In an embodiment, the thickness of the wireless sensor is less than or equal to 500 microns to 1 millimeter. In an embodiment, the thickness of the wireless sensor is less than or equal to one micron. In an embodiment, the diameter of the wireless sensor is less than or equal to 2 centimeters. In an embodiment, the wireless sensor is capable of surviving and sensing temperatures of up to 1300° C. In an embodiment, the wireless sensor is capable of surviving and sensing temperatures of up to 1400° C. In an embodiment, the wireless sensor is capable of surviving and sensing temperatures of up to 1600° C. In an embodiment, the wireless sensor is capable of sensing temperatures that range from 500-1400° C. In an embodiment, the wireless sensor is capable of sensing temperatures that range from 500-1600° C. In an embodiment, the wireless sensor is capable of sensing temperatures that range from 650-1800° C. In an embodiment, the sensor is capable of sensing temperatures with an accuracy of 10° C. In an embodiment, the sensor is capable of sensing temperatures at pressures of 200-600 psi. In an embodiment, the wireless sensor is resistant to oxidation or corrosion. In an embodiment, the wireless sensor is manufactured via a process described below. In an embodiment, the sensor comprises a novel microstrip patch antenna that serves as a passive resonator that responds to an interrogation by another antenna such as one or more of the interrogating antenna describe above. In an embodiment, the sensor enables reliable wireless transmission of sensor data while keeping the overall volume of the sensor small so as not to distort gas flow profile in the engine. In an embodiment, the wireless sensor comprises a high gain patch antenna that can be interrogated from outside the engine. In embodiment, the wireless sensor is specifically tunable such that the return signal varies based on the temperature of the component it is installed on or in. In an embodiment, the wireless sensor is capable of real time, in situ, and continuous temperature sensing. In an embodiment, the wireless sensor is capable of continuously sensing temperatures inside an operating engine for a period of 8000-10,000 hours. In an embodiment, the wireless sensor comprises an integrated cavity filter/antenna system as described in U.S. Pat. No. 8,860,532, which is incorporated herein by reference in its entirety. In an embodiment, the sensor is manufactured via one or more of the methods described below.

In yet another aspect of an embodiment of the invention, a method for monitoring the temperature of a gas turbine engine is provided. In an embodiment, the method comprises interrogating a wireless sensor (such as one or more of the wireless sensors described herein) installed on or in a component of a gas turbine engine; receiving a return signal from the wireless sensor; and processing the return signal to determine a temperature of the component. In an embodiment, multiple wireless sensors are used to determine temperatures in multiple components of the engine. In an embodiment, 1-100 wireless sensors are used. In an embodiment, one or more of the wireless sensors comprise patch antennas. In an embodiment, the size, geometry, design, or composition of the multiple wireless sensors is varied so that distinct return signals from each can be distinguished. In an embodiment, the return signal is in the RF range. In an embodiment, the method is capable of sensing temperatures that range from 1000-1400° C. In an embodiment, the method is capable of sensing temperatures that range from 1000-1600° C. In an embodiment, the method is capable of sensing temperatures that range from 650-1800° C. In an embodiment, the method is capable of sensing temperatures with an accuracy of 10° C. In an embodiment, the method is capable of sensing temperatures at pressures of 200-600 psi. In an embodiment, the method is capable of determining temperatures in real time. In an embodiment, the method is repeated periodically to obtain temperatures over time. In an embodiment, the method is capable of continuously determining temperatures of components inside the engine while the engine is running. In an embodiment, the method is capable of continuously determining temperatures inside an operating engine for a period of 8000-10,000 hours.

In yet another aspect of an embodiment of the invention, methods of manufacturing the sensors are provided including by a physical vapor deposition (PVD) process and a thermal spraying process. In an embodiment, Polymer Derived Ceramic (PDC) sensors made from Alumina ($Al_2O_3$) and Silicon Carbon-Nitride (SiCN) are manufactured and used to withstand and detect temperatures up to 1,000° C. In an embodiment, the sensor sustains temperatures up to 1000° C. during long term operation of the part of the engine from 8,000 to 10,000 hours. In an embodiment, sensors and bonding to blades sustain temperatures up to 800° C. during long term operation for 8,000 cycles, in addition to long term survivability up to 10,000 hours.

BRIEF DESCRIPTION OF THE DRAWINGS

Objects, features, and advantages of the invention will be apparent from the following more particular description of embodiments as illustrated in the accompanying drawings, in which reference characters refer to the same parts throughout the various views. The drawings are not necessarily to scale, emphasis instead being placed upon illustrating principles of the invention. Although example embodiments and associated data are disclosed for the purpose of illustrating the invention, other embodiments and associated data will be apparent to a person of skill in the art, in view of this disclosure, without departing from the scope and spirit of the disclosure herein.

FIG. 1A shows a gas turbine engine in accordance with an embodiment of the invention;

FIG. 1B shows a high temperature probe antenna interrogator in accordance with an embodiment of the invention;

FIG. 1C shows a passive ceramic resonator for wireless sensing in accordance with an embodiment of the invention;

DETAILED DESCRIPTION

Reference will now be made in detail to embodiments of the present invention, examples of which are illustrated in the accompanying drawings. The following description and drawings are illustrative and are not to be construed as limiting. Numerous specific details are described to provide a thorough understanding. Nevertheless, in certain instances, well-known or conventional details are not described in order to avoid obscuring the description. References to one or an embodiment in the present disclosure are not necessarily references to the same embodiment; and, such references mean at least one.

Reference in this specification to "an embodiment" or "the embodiment" means that a particular feature, structure, or characteristic described in connection with the embodiment is included in at least an embodiment of the disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present invention is described below with reference to block diagrams and operational illustrations of methods and devices for monitoring a gas turbine engine. It is understood that each block of the block diagrams or operational illustrations, and combinations of blocks in the block diagrams or operational illustrations, may be implemented by means of analog or digital hardware and computer program instructions. These computer program instructions may be stored on computer-readable media and provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Figure 1:
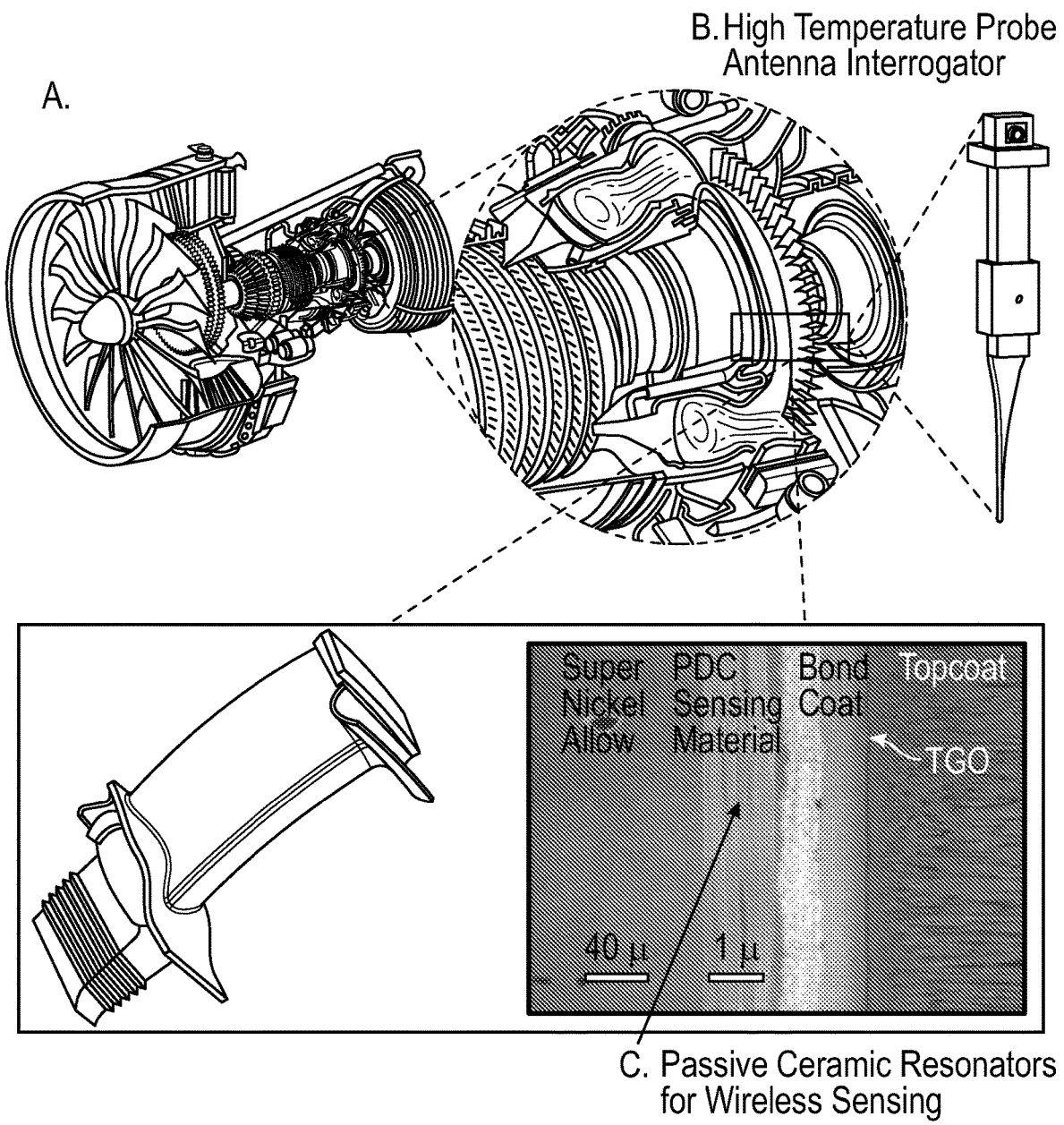
FIG. 1 shows a gas turbine engine instrumented with a system in accordance with an embodiment of the invention.
Figure 2:
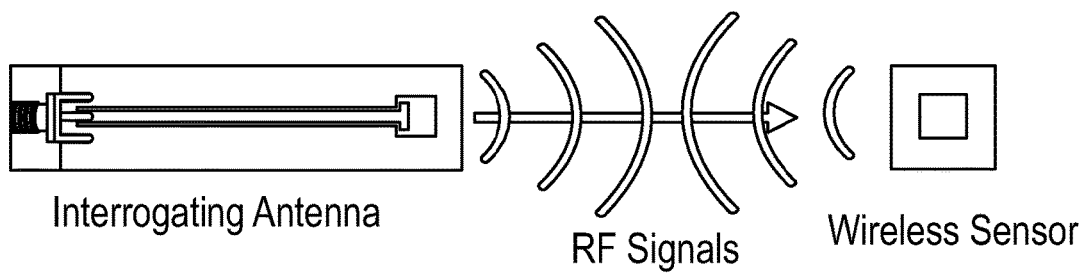
FIG. 2 shows a block diagram of a system for monitoring temperature in accordance with an embodiment of the invention using a high temperature robust interrogating antenna.
Figure 3:
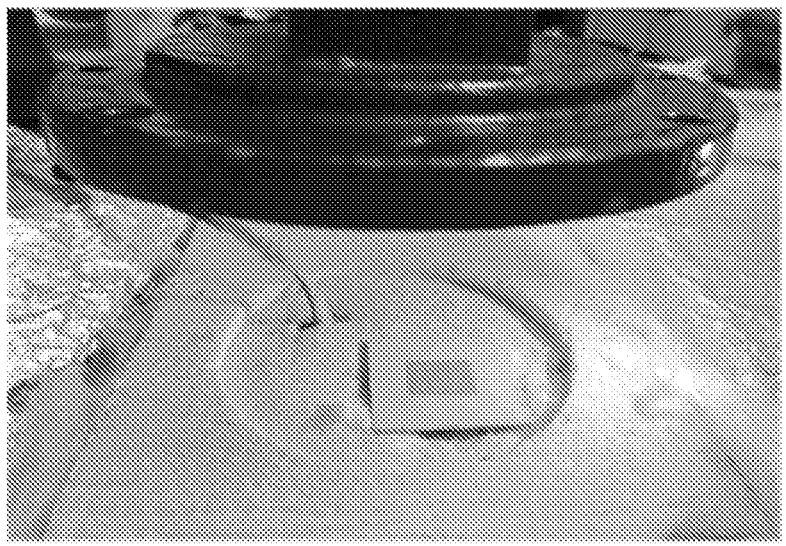
FIG. 3 shows a wireless sensor in accordance with an embodiment of the invention.
Figure 4:
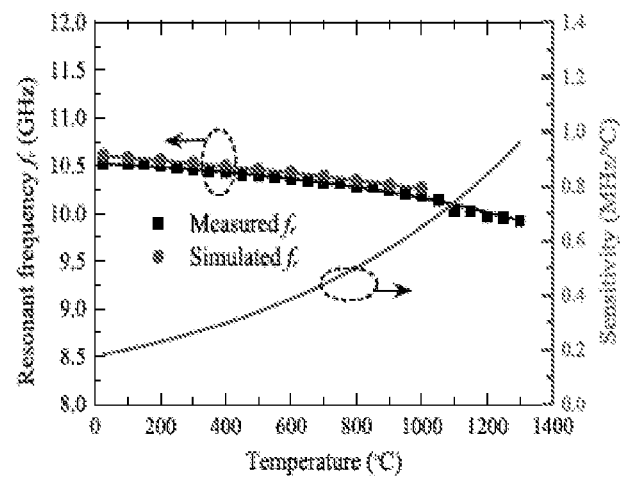
FIG. 4 shows lab results in accordance with an embodiment of the invention.
Figure 5:
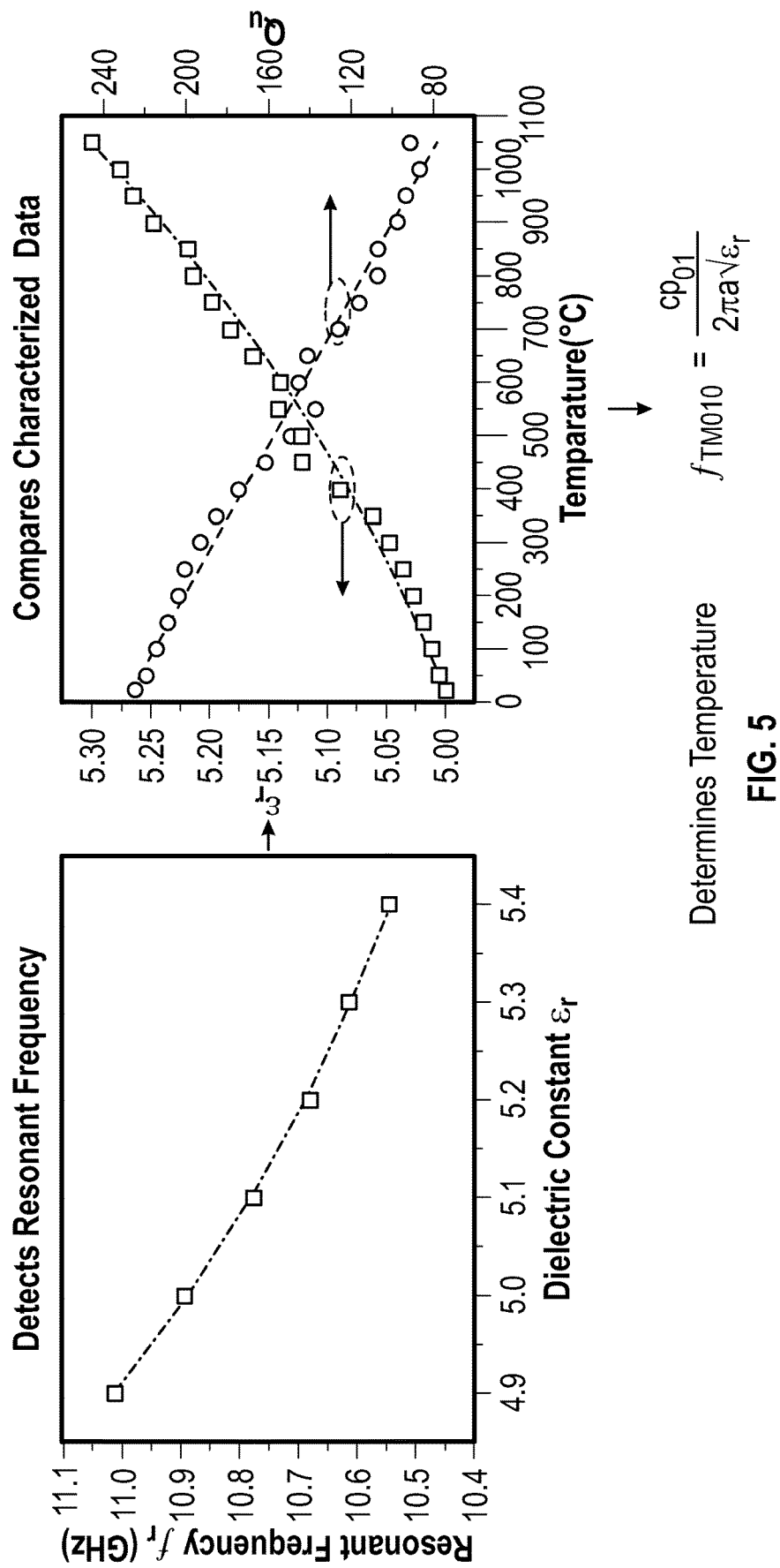
FIG. 5 shows a method of determining temperature based on a return signal in accordance with an embodiment of the invention in accordance with an embodiment of the invention.
Figure 6:
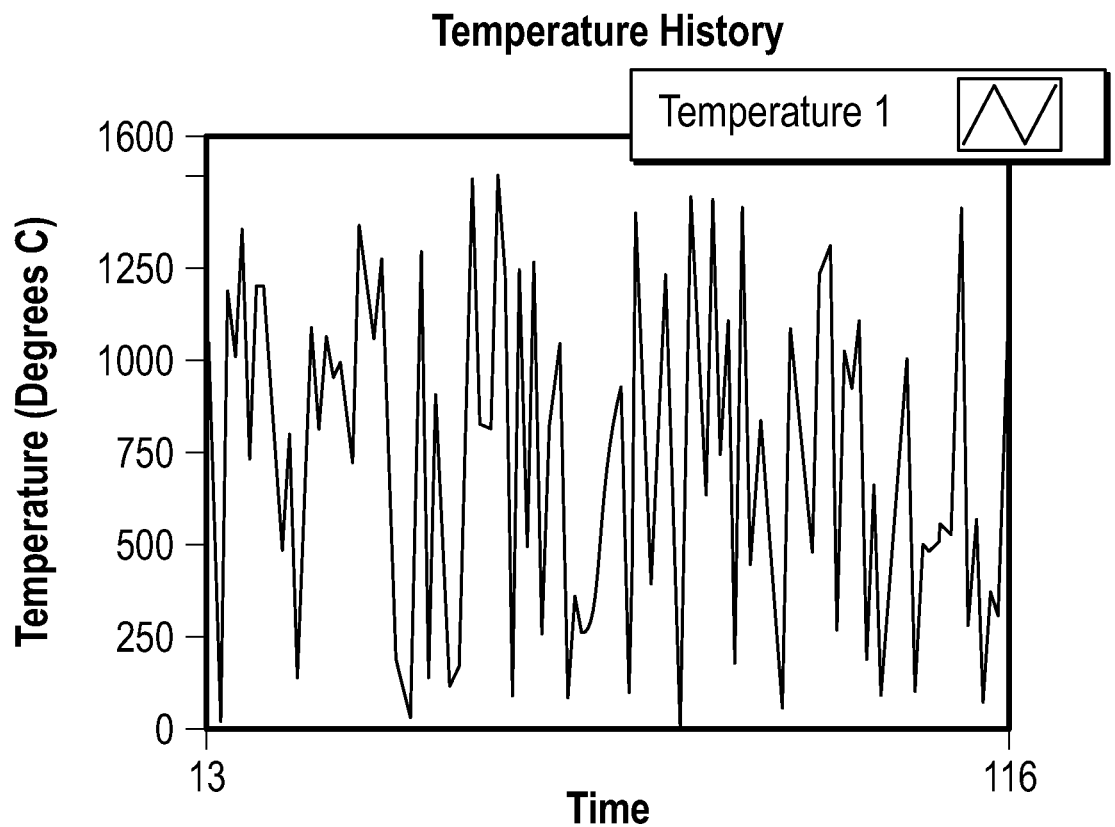
FIG. 6 shows the results of continuous temperature monitoring over time in accordance with an embodiment of the invention.

FIG. 1 shows a gas turbine engine instrumented with the new wireless sensor system. FIG. 1A shows a gas turbine engine in accordance with an embodiment of the invention. FIG. 1B shows a high temperature probe antenna interrogator in accordance with an embodiment of the invention. FIG. 1A shows a probe antenna installed in the gas turbine engine in accordance with an embodiment of the invention. FIG. 1C shows a passive ceramic resonator for wireless sensing in accordance with an embodiment of the invention. In an embodiment, the passive ceramic resonator comprises one of the wireless sensors described herein. FIG. 1A shows the wireless sensor installed in the gas turbine engine in accordance with an embodiment of the invention. FIG. 1C shows the layers of a component of the engine in accordance with an embodiment of the invention. As shown in FIG. 1C, the wireless sensor may comprise a PDC sensing material positioned above a super nickel layer of the component but below the bond coat of the component. In an embodiment, the PDC sensing material is positioned above below a top coat of the component. In an embodiment, the PDC sensing material/layer is less than or equal to 500 microns thick. In an embodiment, the PDC sensing material is less than or equal to one micron thick. In an embodiment, the diameter of the PDC sensing material is less than or equal to 2 centimeters.

In an embodiment, PDC sensing material acts as an antenna, which can be wirelessly read directly on turbomachinery such as turbine blades. In an embodiment, the PDC sensing material is positioned on a surface of a component inside the turbine. In an embodiment, the PDC sensing material is positioned underneath a thermal barrier coating of a component of the turbine. In an embodiment, the system provides real time, in situ, and continuous temperature monitoring directly on metal surfaces of engine components including grounded metal components. In an embodiment, the wireless sensor is used for validation of the temperature of gas, blades, and vanes.

To achieve this, the high temperature sensing capability of the PDC is optimized so that temperatures in the range 100-1400° C. can be read with an accuracy of 10° C. In an embodiment, the PDC is optimized so that temperatures in the range 650-1800° C. can be read. Small-sized sensors can be installed in hard to reach areas in the turbine, and transmit the sensed data wirelessly thereby enabling heat loads to be quantified. The sensor can be made of PDC that are able to withstand the high temperature and harsh environment of turbine engines. In an embodiment, the sensor can survive and sense temperatures up to 1300° C. In an embodiment, the sensor can survive and sense temperatures up to 1600° C. In an embodiment, the sensor can survive and sense temperatures up to 1800° C. In an embodiment, the system will be able to measure small temperature changes in the desired high temperature range (800-1400° C.). In embodiment, the wireless sensor will require no external power source or batteries as it is tuned to act as a passive resonator in response to an RF interrogation signal. In an embodiment, the wireless sensor is between 1 micron to 1 mm. In an embodiment, the wireless sensor has a smooth surface so as to have minimal affect on the air flow in a turbine. In an embodiment, the wireless sensor measures gas temperature directly on the surface of thermal barrier coating of turbomachinery including blades or vanes. In an embodiment, one or more wireless sensors reveal information relating to maximum power produced by the turbine. In an embodiment, one or more wireless sensors are used to measure temperature inside of the thermal barrier coating of a component of the turbine.

In an embodiment, the system or wireless sensors are manufactured using one or more of the following techniques: Microelectromechanical system (MEMs) manufacturing processes to develop small sized sensors; plasma printed processes to etch and deposit sensing elements from MEMs based designs on turbomachinery; thermal spraying processes to deposit sensing elements and materials on turbomachinery; Physical Vapor Deposition (PVD) to sputter electrical and non-conductive sensor elements to Inconel surface; and additive manufacturing processes for making the wireless sensor that includes forming the PDC. In an embodiment, the sensors can be printed on flexible thin film.

Figure 7:
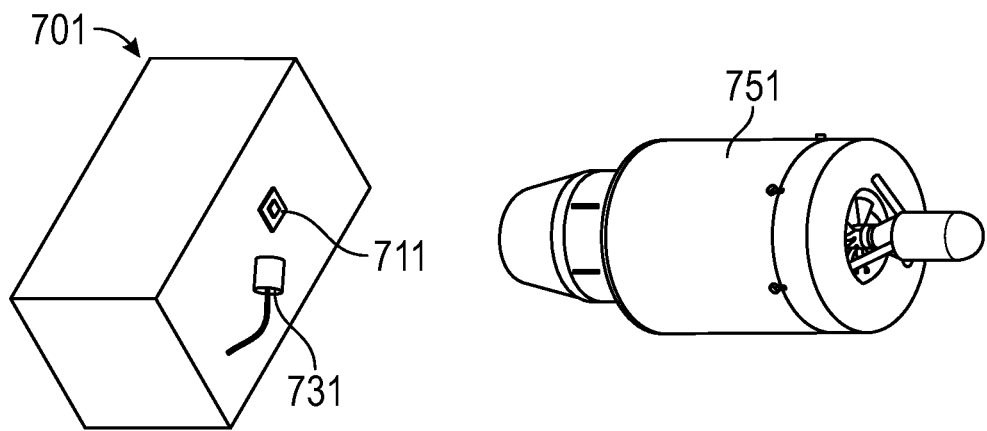
FIG. 7 shows a system for wireless monitoring of a gas turbine engine in accordance with an embodiment of the invention.

FIG. 7 shows a system 701 for wireless monitoring of a gas turbine engine in accordance with an embodiment of the invention. This drawing is meant to show some possible components of such a system and is not to scale. Other components may be included. The embodiment shown includes a wireless sensor 711, such as one or more of the wireless sensors described herein. In embodiment, the wireless sensor 711 is a wireless high temperature sensor that can be embedded in or bonded to a surface of a component of a gas turbine engine as described herein. The embodiment shown also includes an interrogating antenna 731, such as one or more of the interrogating antennas described herein. The embodiment shown also includes a gas turbine engine 751, such as one or more of the gas turbine engines described herein. In an embodiment, the gas turbine engine is a micro-gas turbine engine. In an embodiment, the interrogating antenna 731 is an RF antenna configured to interrogate the wireless sensor 711 to obtain a temperature related to the gas turbine engine 751.

Figure 8:
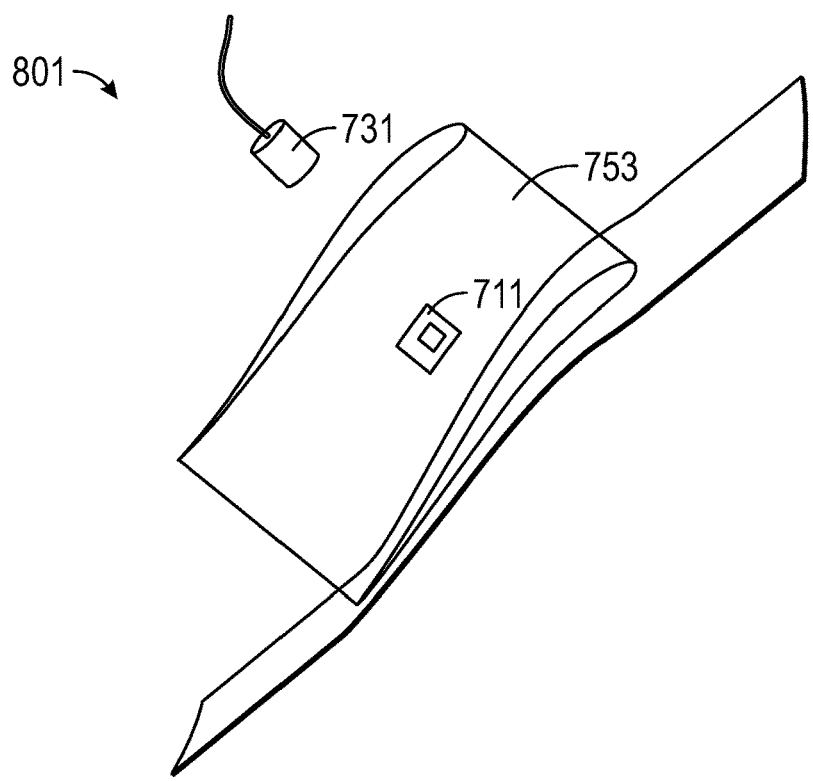
FIG. 8 shows a system for wireless monitoring of a gas turbine engine wherein a wireless sensor is in embedded in or bonded to a gas turbine blade in accordance with an embodiment of the invention.

FIG. 8 shows a system 801 for wireless monitoring of a gas turbine engine wherein the wireless sensor 711 is in embedded in or bonded to a gas turbine blade 753 in accordance with an embodiment of the invention. This drawing is meant to show some possible the components of such a system and is not to scale. Other components may be included. In an embodiment, the gas turbine blade 753 is a stationary component of a gas turbine engine 751. In an embodiment, the gas turbine blade 753 is a moving or rotating component of a gas turbine engine 751. In an embodiment, the wireless sensor 711 is embedded in or bonded to a surface of the gas turbine blade 753 in accordance with one or more of the methods described herein.

Figure 9:
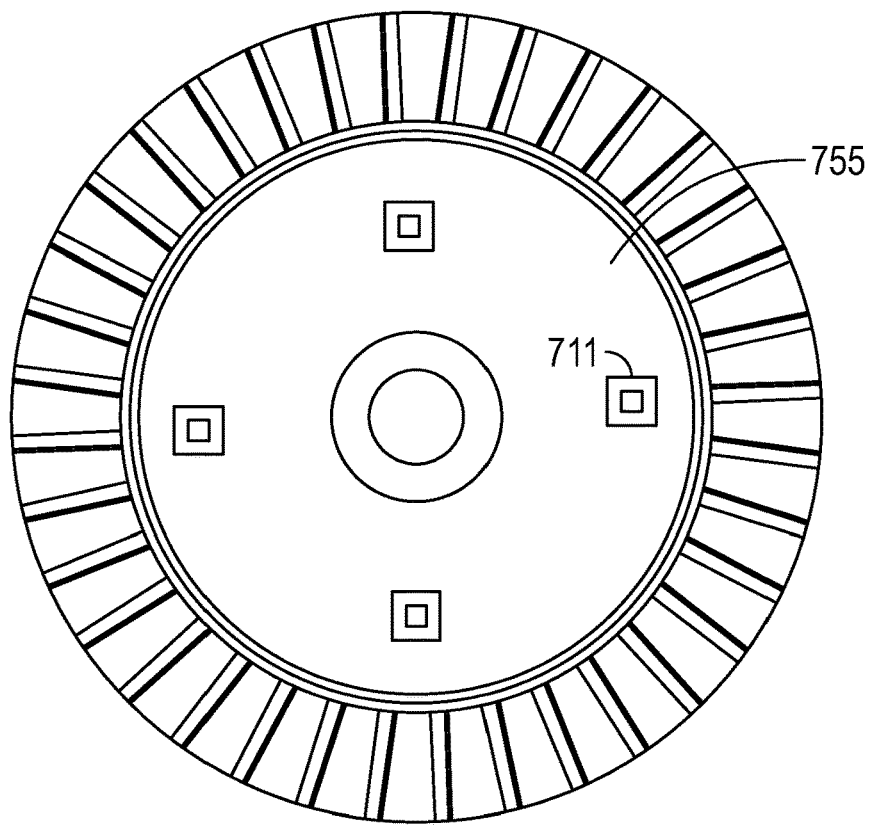
FIG. 9 shows a wireless sensor embedded in or bonded to a gas turbine wheel or rotor in accordance with an embodiment of the invention.

FIG. 9 shows a wireless sensor 711 embedded in or bonded to a gas turbine wheel or rotor 755 in accordance with an embodiment of the invention. This drawing is not to scale and other components may be included. In an embodiment, the wireless sensor 11 is embedded in or bonded to a surface of the gas turbine wheel or rotor 755 in accordance with one or more of the methods described herein.

Figure 10:
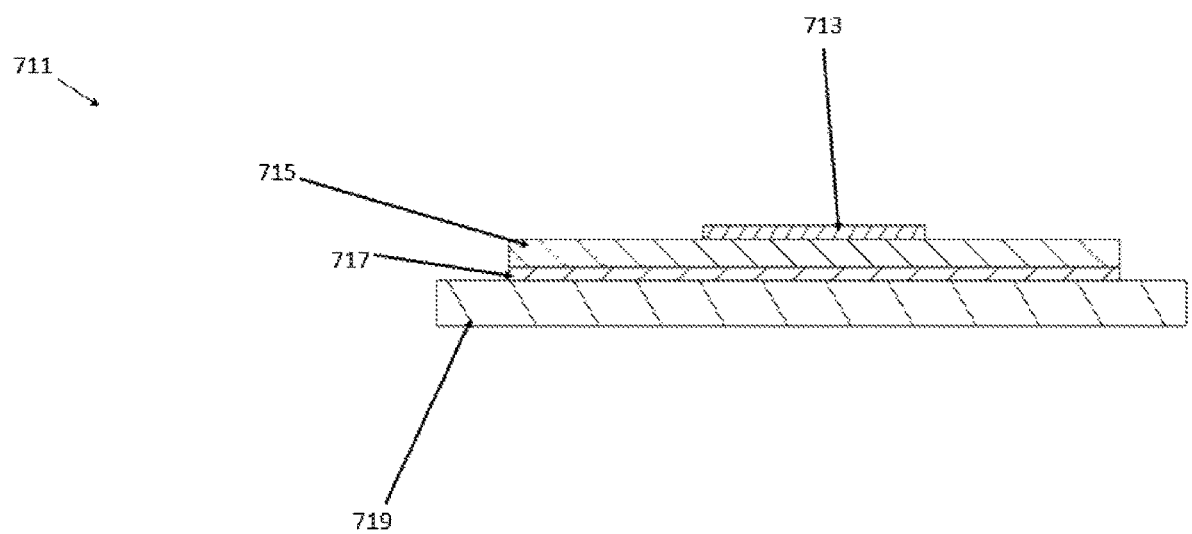
FIG. 10 shows a wireless sensor in accordance with an embodiment of the invention.

FIG. 10 shows a wireless sensor 711 in accordance with an embodiment of the invention. This drawing is not to scale and other components may be included in the wireless sensor 711. In the embodiment shown the sensor 711 includes layers 713, 715, 717, and 719. In an embodiment, additional layers or components can be included in the sensor 711. The wireless sensor 711 can be manufactured and/or deposited on a component of a gas turbine engine or other material in accordance with one or more of the methods described herein or other methods known in the art. In an embodiment, the layers of the sensor 711 may be in a different order. In the embodiment shown, the layer 713 includes reflective patch antenna metallic components. In an embodiment, layer 713 also includes a bond coat that includes MCrAl[Ta,Hf,Si]Y coatings, where M=Fe, Co, Ni or any combination of the three. In embodiment, layer 713 also includes one or more of platinum, nickel, copper, gold, palladium, silver, tungsten, titanium, or tantalum. In an embodiment, layer 715 is a polymer derived ceramic (PDC) layer including one or more of Aluminum Oxide, Silicon carbide nitride, Titania, Zirconia, YSZ, or Silicon Carbide. In an embodiment, layer 717 is a bond coat which provides a metallic ground plane for the sensor. In and embodiment, the bond coat includes one or more MCrAl[Ta,Hf,Si]Y coatings where M=Fe, Co, Ni or any combination of the three. In an embodiment, layer 719 is a ceramic matrix composite embedded in or bonded on the gas turbine blade or other component of the turbine engine 751. In an embodiment, layer 719 is part of a ceramic matrix composite gas turbine blade, a thermal barrier coated gas turbine blade, or a non-thermal barrier coated gas turbine blade. In an embodiment, presence of cobalt improves coating ductility and hot corrosion resistance. In an embodiment, presence of chromium and yttrium improve oxidation resistance by increasing the activity of Aluminum and by improving the spallation resistance of the oxide scale. In an embodiment, chromium and aluminum function to provide a reservoir that continually replenishes the oxide scale. In an embodiment, gas atomization ensures excellent chemical homogeneity and high purity which results in consistent coating results. In an embodiment, additions of rhenium (Re) have been shown to improve isothermal or cyclic oxidation resistance, and thermal cycle fatigue (Czech et al., 1994). In an embodiment, additions of tantalum (Ta) can also increase the oxidation resistance. In an embodiment, a NiAl (5% Al typically) is a great bond coat, lower cost, and has good high temperature oxidation resistance (service temp. up to 800 deg C.). The MCrAlYs have an advantage in oxidation resistance (service temp. of at least 850 deg C. and up to 1000 deg C.) and also have an advantage in hot corrosive environments.

In an embodiment, a wireless high temperature sensor 711 can be implemented in the ultra-high temperature environment of a gas turbine engine. As further described herein, in an embodiment, the wireless sensor 711 is a polymer derived ceramic sensor made from SiCN. In an embodiment, the wireless sensor 711 is tailored such that its electro-mechanical properties can measure and withstand temperatures over 800° C. In an embodiment, an interrogating antenna 731 is designed and assembled using available components and is connected to an interface to process and store the data obtained from the sensor. In an embodiment, the sensor performance was characterized and calibrated up to 1000° C. In an embodiment, the sensor 711 can be positioned 0-50 or more cm from the interrogating antenna 731. In an embodiment, various polymer derived ceramics (PDCs) are incorporated into the sensor 711. In embodiment the sensor 711 is embedded in or bonded to a gas turbine blade material Inconel. In an embodiment, the systems, methods, and apparatus described herein can be used to sense temperatures of a microturbine engine or gas turbine engine or its gas path in an elevated temperature range. In an embodiment, the systems, methods, and apparatus described herein can be used to monitor existing turbines as part of a preliminary Blade Health Check Prognostic program.

Figure 11:
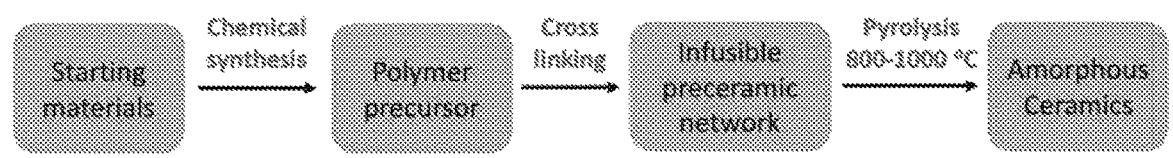
FIG. 11 shows a method of synthesizing polymer-derived ceramics in accordance with an embodiment of the invention.

In an embodiment, the sensor 711 includes a patch antenna engineered and fabricated to withstand temperatures well over 800° C. In an embodiment, Kion Ceraset polysilazane is used as the substrate for the sensor 711. Polysilazane is a liquid thermosetting resin containing repeat units of nitrogen and silicon bonded in an alternating sequence. Polysilazane is versatile with a low viscosity of 80 cps at room temperature and can yield ceramics through pyrolysis. The electrical properties of this PDC can be tailored to obtain high temperature survivability, excellent oxidation resistance, and flexible manufacturing capabilities. The processing steps for synthesizing polymer-derived ceramics according to an embodiment of the invention can be seen in FIG. 11. In an embodiment, additional or different steps are used or the steps occur in a different order. In an embodiment, the liquid resin can be cured into a polymer or ceramic.

In an embodiment, to fabricate the sensor 711, a PDC is formed into a puck. In an embodiment, the puck has a diameter of about 18.24 mm. To accomplish this, the Kion Ceraset polysilazane liquid resin is first put into a mold and heated to perform cross-linking of the polymer resulting in a semi-transparent polymer. Then the polymer is ground up using a ball mill and packed into a mold and pressed into a puck. Finally, the puck is pyrolyzed into an amorphous ceramic. In an embodiment, to fabricate the antenna, an inverse mold of the patch is created out of 6061 aluminum and cut to size using a water jet. In an embodiment, the tolerance for the waterjet is 0.001 in. After the mold is created, carbon paste in a silicate aqueous solution is used to form the conductive patch and ground plane. Carbon paste is brushed into the inverse mold and a clamp is used to apply pressure. The trace is then air dried for about four hours and then placed into a furnace in order to evaporate the water in the matrix. The same procedure was used in order to fabricate the ground plane. In embodiment, layer 717 acts as the ground plane.

In an embodiment, the sensor 711 is made by wet sanding a thick sample down to around 0.78 mm thickness. In an embodiment, a platinum patch is applied using an inverse mold cut out of a piece of FR4 board. This mold can also be made using a piece of plastic or aluminum. The reason for using the FR4 board is because of it's smooth surface and ease of cutting with the CNC mill. The platinum paste has low viscosity, so it tends to seep out from the edges of the mold. An aluminum mold with carbon tape around the edges can be used, which acts as a gasket to prevent the platinum from seeping. Then it is placed in an oven at 150° C. for 15 minutes. In an embodiment, clumped portions of the platinum paste are allowed to set in the air for 2 hours. Then using the oven or furnace with the door open around 90° C., the sensor is placed in the furnace for a few minutes then cooled for a few minutes. This process can be repeated until the platinum is set. On close inspection, in an embodiment, the liquid in the platinum can be seen to evaporate. In an embodiment, this method of placing the sensor in the furnace until the liquid in the platinum paste evaporates allows the platinum to be applied in layers to increase the thickness and coverage. For example, the liquid mixture can be allowed to fully evaporate then another layer can be applied and the process repeated until there is enough coverage and thickness to be conductive. In an embodiment, the ku band waveguide is used to interrogate the smaller high frequency sensor 711. In an embodiment, on the Vector Network Analyzer (VNA), the frequency sweep is set, the trace data is saved, and data math is used to subtract the data from the reading. Then, the sensor 711 is placed on a flat piece of cardboard and placed underneath the waveguide. This technique can also used for higher frequency regular sized sensors.

In an embodiment, an interrogation antenna, such as the antenna 731, a receiving antenna, and a vector network analyzer are used to receive and record the resonance of the sensor 711. In an embodiment, the interrogating antenna 731 also acts as the receiving antenna. Appropriate antenna and vector network analyzers are readily available and can be selected by one skilled in the art. In embodiment, a horn antenna is used. In an embodiment, the interrogation antenna 731 operates from a range of 0.6-8 GHz with a gain of 6-15 dB. In an embodiment, the vector network analyzer is a PXI-M9375 from Keysight Technologies that produces a frequency sweep that is broadcasted by the interrogation antenna 731. In an embodiment, the network analyzer can produce signals between 300 KHz-26.5 GHz. In an embodiment, the signal travels through free space until it reaches the sensor 711.

In an embodiment, for frequencies other than resonant frequency, the signal will be rejected. In an embodiment, at the resonant frequency, the patch antenna of the sensor 711 will accept the energy and re-radiate the energy back into space. This effect can be accurately recorded by backscattering parameters. Backscattering parameters refer to the ports of transmission and receiving. The S11 parameter, receiving from port 1 and transmission through port 1, can be referred to as reflection. From the S11 plot, the resonant frequency of the sensor can be accurately described at the frequency where the signal is accepted by the antenna, thus not returning to port 1. A k-type thermocouple can be placed inside of the furnace and read in by a PXIE-thermocouple DAQ in order to verify the temperature displayed by the furnace thermocouple. In an embodiment, a horn antenna is positioned about 50 cm away and set to transmit an electromagnetic wave toward the gas turbine engine 751.

Figure 12:
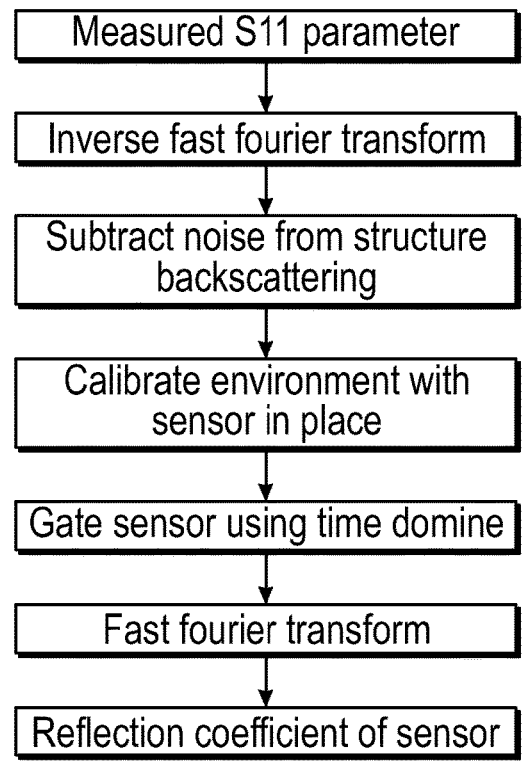
FIG. 12 shows a method of using digital signal processing to extract a sensor's resonant frequency in accordance with an embodiment of the invention.

In an embodiment, digital signal processing (DSP) is used to extract the sensor's resonant frequency, which is later converted to temperature. Time-domain gating can be applied to isolate the temperature sensor in a high reflection environment. The flow chart of the DSP algorithm according to an embodiment of the invention is shown in FIG. 12. In an embodiment, additional or different steps are used or the steps occur in a different order. In the embodiment shown in FIG. 12, first, the S11 graph is recorded by interrogating the engine 751 with a horn antenna or other interrogating antenna 731 without a sensor 711. Then, an Inverse Fast Fourier Transform (IFFT) is used to transform from the frequency to time domain. In the time domain, S11 response is calibrated to characterize the structure mode backscattering that occurs due to re-flections inside of the engine 751. These internal reflections can be filtered out by subtracting the reflections from the S11 graph. Second, the sensor 711 is placed on a component of the engine 751 and another calibration is performed to isolate the sensor 711. With the sensor 711 in place at a distance, a time domain gate is applied to isolate the sensor's response inside of the engine 751. In an embodiment, an appropriate time domain gate is found by experimentation with the system 701, 801, or other system. In an embodiment, after the gate is applied, a Fast Fourier Transform (FFT) is used to convert back to the frequency domain from the time domain. In an embodiment, a final processed signal is then scaled and the lowest amplitude is taken as the resonant frequency of the sensor 711. This resonant point is then processed by an algorithm that references the resonance of the sensor 711 to permittivity, and then temperature.

In an embodiment, a LabVIEW program can be used to automate the data collection of the resonant frequency and the thermocouple data. Using an NI chassis with the VNA and thermocouple card it is possible to record both the resonant frequency and the thermocouple data at the same time. The challenge with this approach i.e not filtering the structure mode backscattering was that sometimes the sensor's response could not be isolated. The PXI-e VNAs have a built-in user interface called a Soft Front Panel (SFP). In an embodiment, the filtering techniques in the SFP involve transforming the data into the time domain, setting up a time domain gate, transforming back into the frequency domain, subtracting the environmental data in the frequency domain from the trace, then applying the time domain gate. The LabVIEW program can be used the thermocouple DAQ card to store the temperature at each loop (each loop one frequency sweep is performed.) The program can also search for the minimum of the S11 trace and store the minimum in a file along with the two thermocouple measurements.

Figure 13:
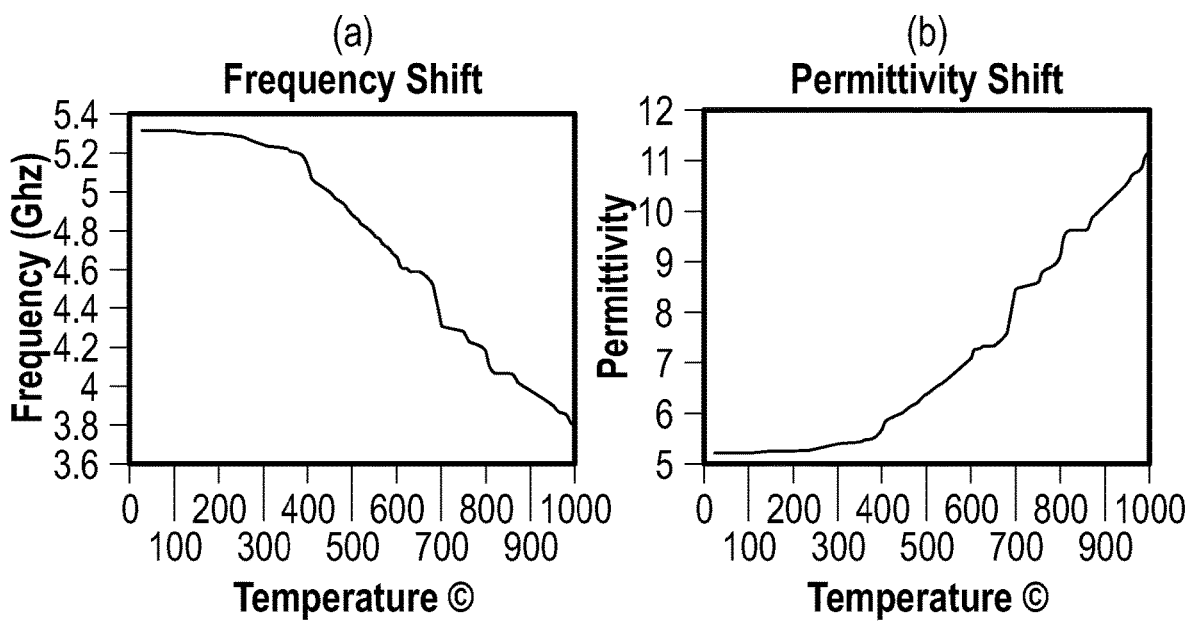
FIG. 13 shows results of an experiment to show the relationship between signal frequency and temperature in accordance with an embodiment of the invention.

Using this setup and the SFP, resonant response of the sensor can be recorded for temperatures upto 1000° C. As the temperature increases, temperature measurements can be made every 50° C. A plot of the resonant frequency vs temperature from an experiment with a furnace can be seen in FIG. 13. There is a monotonically decreasing relationship between the resonant frequency and the temperature of the furnace. This is due to an increase in permittivity of the PDC substrate which can be calculated and can be seen in FIG. 13. FIG. 13(a) shows change in resonant frequency with temperature. FIG. 13(b) shows change in permittivity with temperature. At around 400° C., there is an increase in the slope between permittivity and temperature. This is due to an exponentially increasing permittivity change of the PDC substrate. Thus, as the temperature is increased to 1000° C., the temperature sensor has an increase in resolution.

In an embodiment, Computational Fluid Dynamics (CFD) analysis can be used to determine hot spots on a turbine blade 753. In an embodiment, one or more sensors 711 are placed at the determined hot spots. Numerous studies have been conducted to investigate the temperature distributions of a 1$^{st}$ stage nozzle for failure mode analysis. [Mazur et al., 2006; Alizadeh et al., 2014] Using these studies as a reference, a steady-state Reynolds Averaged Navier-Stokes, Conjugate Heat Transfer (CHT) analysis of a stationary blade without internal cooling can be undertaken in ANSYS. Using a CHT analysis, blade metal surface temperatures and pressure can be obtained and used to determine temperature sensor locations and the pressures at those spots. The temperature & pressure fields obtained from the CHT analysis can then be used as an input load for a structural analysis of the blade. In an embodiment, a structural analysis of the blade is conducted to obtain stress and deformation of the blade at the potential sensor locations.

Figure 14:
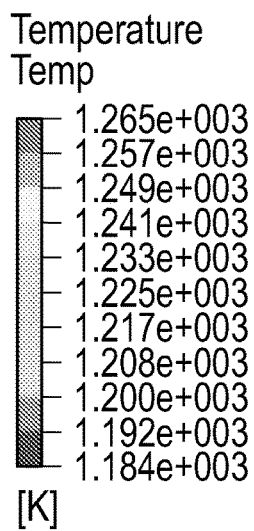
FIG. 14 shows temperature distributions on a turbine blade in accordance with an embodiment of the invention.
Figure 14:
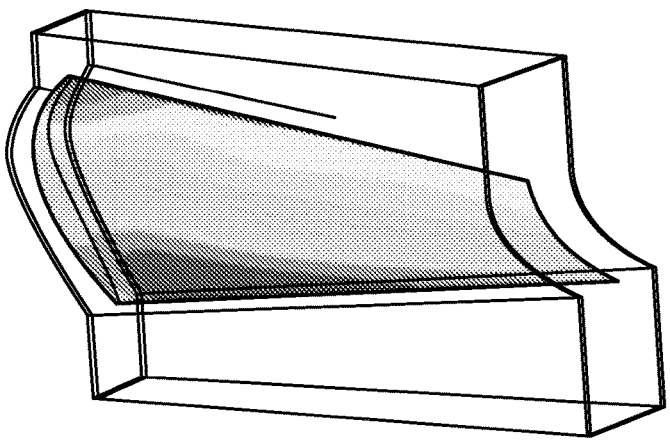
Figure 15:
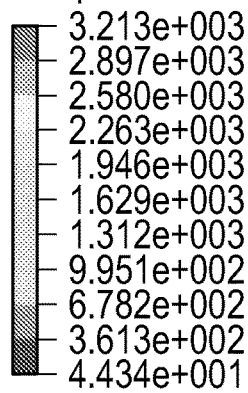
FIG. 15 shows temperature distributions on a turbine blade in accordance with an embodiment of the invention.
Figure 15:
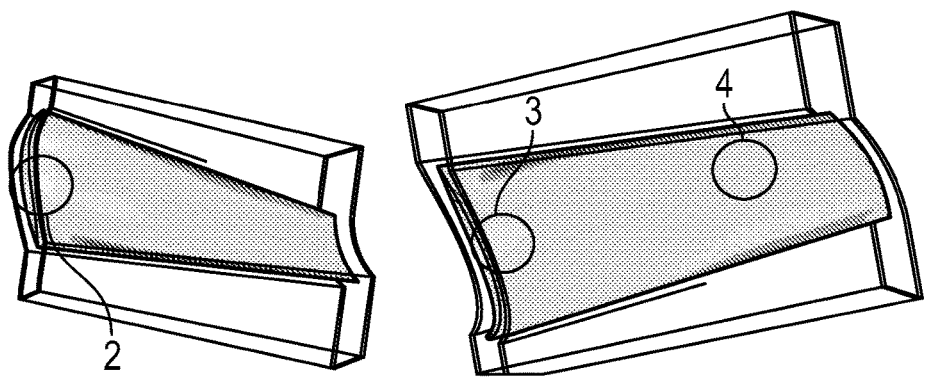

FIGS. 14 and 15 show temperature distributions on a turbine blade 753 where the turbine hub is to the left and the shroud to the right of the view shown. FIG. 14 shows the temperature distribution on the pressure side of the blade surface respectively for the CHT analysis. In FIG. 14, a local maximum temperature of 1265K occurs at the leading edge of the blade close to the hub. This can be attributed to the sharp gradient of blade twist at the leading edge near the hub. Flow stagnation is observed at this edge as well which is also a cause for the localized maximum. There are cooler regions near the trailing edge of the blade since there is rapid acceleration of the fluid in that region. FIG. 15 shows the temperature gradient on the surface of the blade.

From FIGS. 14 & 15 local hot spots & areas of high temperature gradients can be identified. This aids in identifying potential locations for sensor placement. Knowledge of temperature in the high temperature gradient areas can help identify locations of higher stress concentration. This can be implemented in blade-lifing models to give a much accurate prediction of blade life and fatigue. Four potential locations have been identified and marked on FIGS. 14 & 15 and are reflected in Table 1 below; two each on the suction and pressure side. After the potential locations for sensor placement are identified, a stress analysis can be conducted by importing the aero-thermal loads from the CHT analysis to identify the stresses that sensor would be exposed to. Another boundary condition is that the blade was affixed at the hub. The pressure can be obtained from the CHT analysis.

TABLE 1

Conditions at potential locations

| Location | Pressure | Deformation | Stress |
|---|---|---|---|
| Location 1 | 297.4 KPa | Negligible | 4.09 GPa |
| Location 2 | 190.6 KPa | Negligible | 4.09 GPa |

TABLE 1-continued

Conditions at potential locations

| Location | Pressure | Deformation | Stress |
|---|---|---|---|
| Location 3 | 147.8 KPa | Negligible | 4.09 GPa |
| Location 4 | 190.6 KPa | 0.7 mm | 30 KPa |

Figure 16:
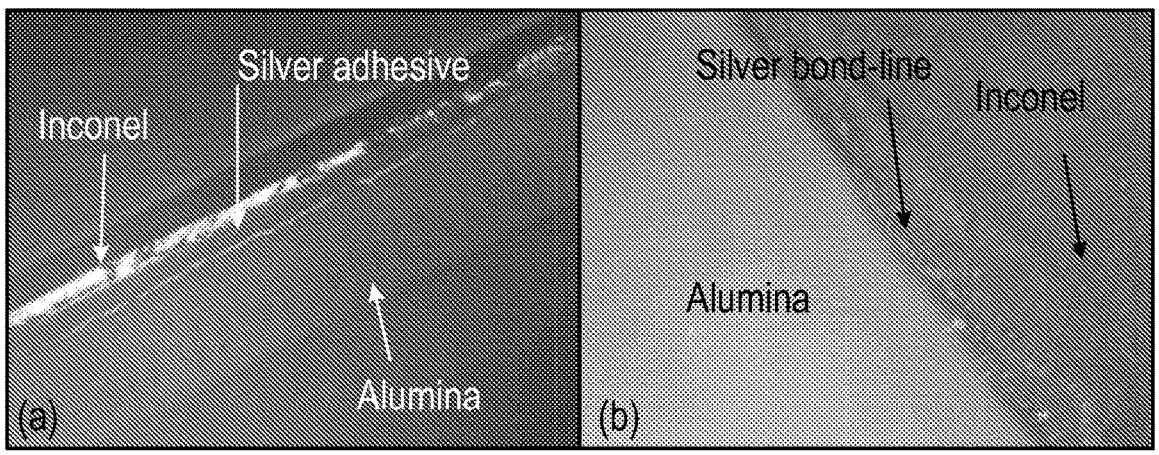
FIG. 16 shows application of electrically conducted based adhesive between an PDC substrate and an Inconel piece in accordance with an embodiment of the invention.

Various binding methods can be used to bond the sensor 711 to a component of the engine 751. A preliminary bonding study was initially conducted using three high temperature adhesives to address the risk of implementing the new sensor system in the harsh turbine environment. Different sensor bonding approaches can be used with Polymer Derived Ceramic (PDC) sensors including Silicon Carbide (SiC), Alumina (Al2O3), and 8% YSZ. Embodiments were capable of withstanding up to 800° C. temperatures within the turbine without distorting gas flow and turbine performance. In an embodiment, a non-conductive bonding material hampers the sensing mechanism of the wireless sensor 711. Considering all these factors, the ideal properties for a bonding material for systems 701 and 801 include:

High temperature resistant
High pressure resistant
Corrosion/Oxidation resistant
Identical Co-efficient of Thermal Expansion to Thermal Barrier Coating (Yttria Stabilized Zirconia) & Blade Material (Nickel Superalloys)
Electrically conductive
Easy application & storage
Optimal Cost In an embodiment, the bonding mechanism involves using three high temperature adhesives: Aremco's Pyroduct 597 A: Silver based—Operating Temperature up to 927° C., Cotronics' Durabond 952: Nickel based—Operating Temperature up to 1093° C., and Cotronics' Durabond 954: Stainless steel based—Operating Temperature up to 1093° C. to bond the PDC material onto Inconel strips, simulating the sensors bonded to the turbine blades. The results of tests suggest that the silver-based adhesive provides the best bonding of the Alumina sensor onto the Inconel blades of the turbine and survivability of the bond in the high temperature turbine environment. FIG. 16 shows the microscopic image of the silver based adhesive between the Alumina substrate and Inconel piece before and after the temperature testing. FIG. 16(a), before heating, shows good bond to Inconel and alumina. FIG. 16(b), after heating, shows good bond with beading which could compromise bond strength.

Figure 17:
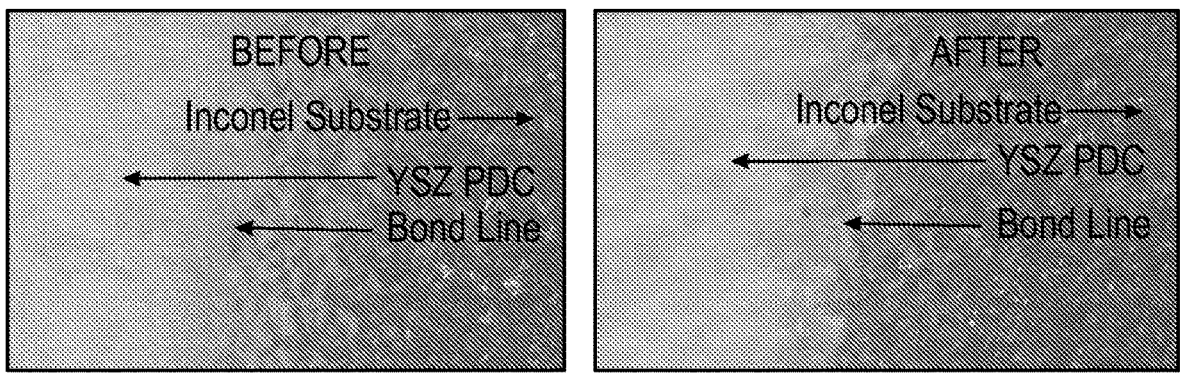
FIG. 17 shows results of a PDC bonding trial in accordance with an embodiment of the invention using a thermal spraying process.

One bonding mechanism usable with the disclosed invention uses a thermal spray process to deposit the sensing material onto Inconel coupons. The results of tests using the thermally sprayed sensors indicate this mechanism can be used to deposit sensors 711 onto blades 753 in a way that will not intrude gas flow or affect sensor performance. Thermal spray is the same method used to secure the thermal barrier coating to the blade and the process has been shown to be highly effective for bonding ceramic material to Inconel. FIG. 17 shows a microscopic image for Oerlikon Metco's Amdry 365-2 which was utilized in thermally spraying and securing the sensors on the Inconel surface directly. The before and after pictures show no significant change to the bond-line after exposing it to high temperatures. FIG. 17 shows PDC characterization via metallurgical microscope of successful preliminary bonding trial of 8%

YSZ (a) before high temperature testing, and (b) after high temperature of 800 C for 20 minutes.

A battery of tests was designed and performed to evaluate the sensing limitations of the sensor 711. Most of the Radio Frequency (RF) parameters of interest were carefully characterized, and geometrical limits were found. Extensive and independent testing of the Sensatek resonant temperature structure was performed. The purpose of this test was to extensively test the capabilities of the high temperature sensor 711 made from Alumina. Excitation was provided by a calibrated network analyzer through a Microwave Research C40-LC transceiver. Specific gating was used to isolate primary resonant reactions (as opposed to other reflections). In all of the tests, the sensor 711 was placed flat on the surface, and the transceiver was carefully aligned over the sensor. The tests measured bandwidth (3 dB), center frequency of the sensor response as a function of: a) Normal distance b) Horizontal rotation of transceiver c) Sensor Tilt d) Spherical motion of transceiver. The tests conducted were to study the sensor response on a: 1) Non-conductive surface 2) Non-grounded conductive surface 3) Grounded conductive surface. Test 1 was performed with the sensor and transceiver far away from any metal. The sensor rested upon a surface composed of dielectric (wood with resin). The second set of tests was performed with the sensor resting upon a non-grounded piece of metal. The metal chosen was a high nickel steel, typical of the material found in gas turbine blades. The third set of tests was performed with the sensor resting upon a grounded piece of metal. The ground was verified to have a DC value of less than 1 ohm throughout the test. The same conductor was used in Test 3 as in Test 2. These tests intend to show flaws and validate hardware and methodologies for measurements made on or in rotating equipment. The results of these tests are found in Table 2.

material changes to the sensor will also likely affect this, as would geometric changes to the substrate (flat vs. curved, tilted, etc.). Generally, the distance between the transceiver and sensor at which the SRS could be discriminated from the noise floor was found to be good. Typical distances were on the order of 40 to 90 mm. Considering that the system has not been strongly optimized, this is very promising for commercial use, as the distances between a proposed probe and rotating equipment are on the order of 50 to 200 mm. The ability of the system to tolerate horizontal rotation changes and tilt changes was also much better than expected. Typically, resonant systems are very tightly correlated to orientation in every direction. However, this system is robust against several types of orientation change. There were some asymmetries between tilts in one direction versus the other, but this is likely due to the rectangular orifice of the transceiver. There is a moderate coupling null that occurs when the horizontal rotation of the transceiver versus sensor reached 45 degrees. The hypothesized reason is that this is a transition point between competing resonant modes. However, the rotation and tilt degradations are acceptable up to surprisingly high values of 60 to 85 degrees. This means that in a rotating environment, this wide Field of View (FOV) will allow for a long capture window as the rotating sensor quickly passes by the transceiver probe. This wide FOV may even allow for the introduction of more sophisticated signal processing techniques, such as the automated frequency tracking and acquisition window tracking methods mentioned above. The lateral transceiver motion test was also encouraging. Even though the distance between the sensor and the transceiver was only 20 mm, the resonant system maintained resonance above the noise floor even with lateral distance above 70 mm. This ratio of 3.5 to 1 is unexpected and strong. As with the large FOV, this opens the door to long acquisition times with each rotation pass of the sensor.

TABLE 2

Robustness testing results

| Test number | Maximum Normal Distance (mm) | Center Frequency Variance | Average 3 dB BW (MHz) | Horizontal Maximum Rotation Angle (Degrees) | Sensor Tilt (20 mm) Radius Maximum Angle (Degrees) | Spherical Motion (20 mm) Radius Maximum Angle (Degrees) |
|---|---|---|---|---|---|---|
| Test 1 | 85 | 0.2% | 80 | 80 | 60 (North-South)<br>30 (East-West) | 50 (North-South)<br>60 (East-West) |
| Test 2 | 35 | 0.16% | 65 | 45 | 60 (North-South)<br>60 (East-West) | 80 (North-South)<br>85 (East-West) |
| Test 3 | 90 | 0.25% | 80 | 80+ | 60+ (North-South)<br>60 (East-West) | 80 (North-South)<br>83 (East-West) |

Figure 18:
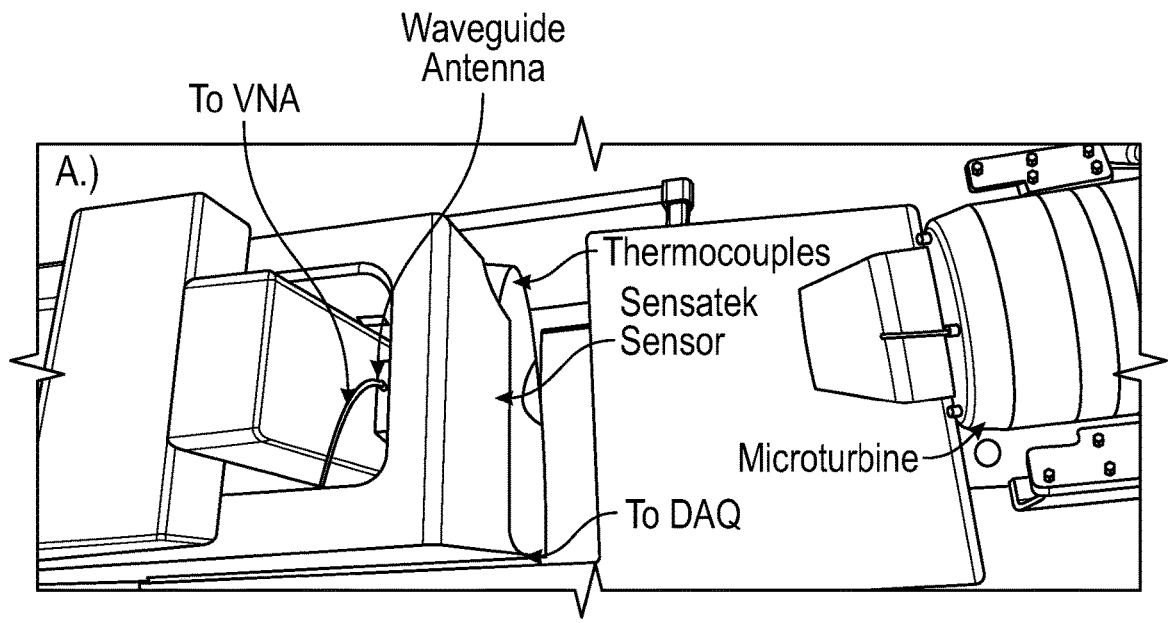
FIG. 18 shows a system used to measure temperature in a hot gas path of a turbine engine in accordance with an embodiment of the invention.
Figure 18:
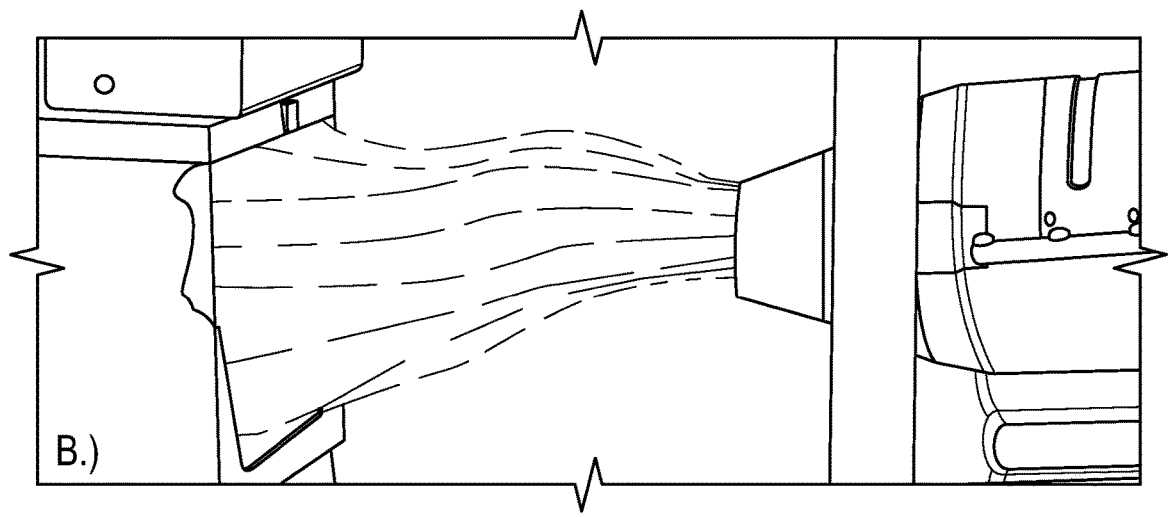

The resonant response of this sensor system was robust to substrates of varying type: dielectric, non-grounded conductor, and grounded conductor. The worst response was from a non-grounded conductor (Test 2). The resonant response itself was not strongly affected, but the noise floor was higher for the non-grounded conductor. This likely means that there were more reflections from this surface than from the other surfaces. This is feasible, as the dielectric surface would have much less reflection than a conductive one. Whether the non-grounded conductor was more reflective because of eddy currents, retransmission, standing electromagnetic transverse modes, or other factors is not completely clear. This disparity between non-grounded and grounded substrate effects on noise floor should be investigated further. Time gating variations should be looked into, as well as different strengths of ground (grounds with varying resistance). Geometrical changes to the sensor and Embodiments of the invention can be used to measure temperatures in the hot gas path of a turbine engine 751 at shown in FIG. 7. A series of high temperature exhaust tests were conducted using a JetCat P200 RX microturbine to establish proof of concept for sensor functionality when exposed to an environment with constant thermal shock, dynamic pressures, high velocity & temperature gas flow. This type of environment is representative of the actual working environment that the sensor is going to be placed in for its ultimate application. The frequency response, magnitude of reflected signal was recorded along with temperature data from thermocouples for the duration of the tests. FIG. 18(a) shows the experimental setup for this test. FIG. 18(b) shows the hot exhaust impinging on the sensor. The microturbine can be controlled using its corresponding ECU. The sensor 711 was mounted on a ridge in a concrete block at approximately 1 feet distance from the center of the microturbine exhaust. A set of supporting concrete blocks were positioned and used such that the exhaust had minimal effect on the stability of the structure. Concrete bricks were used to position and hold the waveguide antenna in place. The waveguide antenna was positioned behind the thickness of the concrete block (~3 cm) as shown in FIG. 18(a) to protect against the high temperature exhaust. This was connected to a Copper Mountain R-140 1-port reflectometer (VNA) which was the source of the RF signal. To obtain temperature readings throughout the duration of the test, 3 type-K thermocouples were attached; 2 in proximity to the sensor, 1 on the waveguide antenna, using Kapton tape. These thermocouples were attached to a DATAQ DI-245 data acquisition (DAQ) device.

Figure 19:
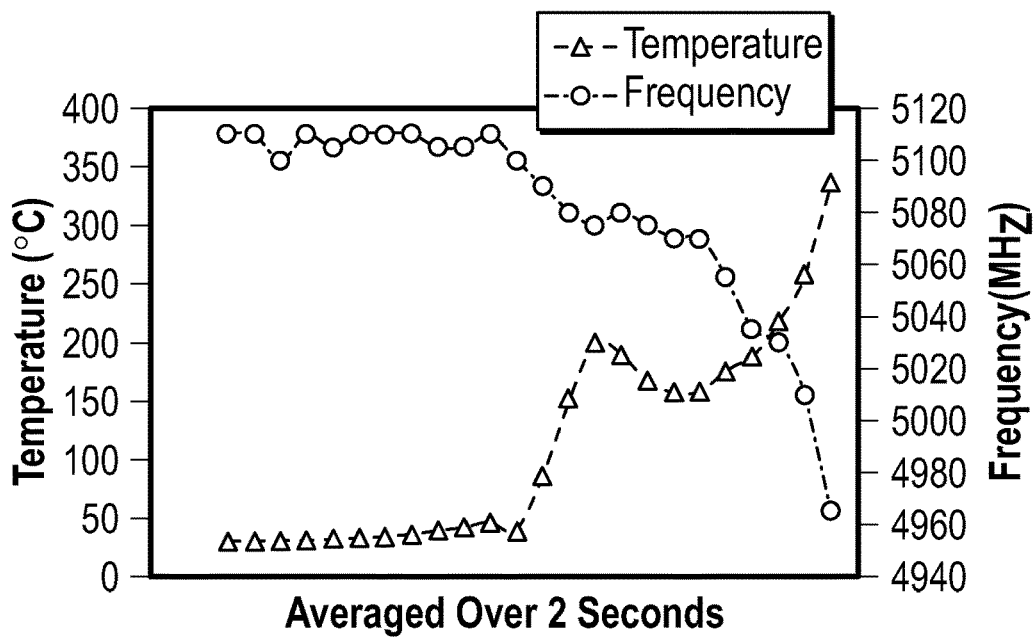
FIG. 19 shows temperature and resonate frequency results derived from the system shown in FIG. 18.

The first run of the microturbine was a ramping-up test, where we rapidly increased the RPM of the microturbine and shut it as soon as it reached the desired speed. It was ramped up to 65,000 RPM for this run. FIG. 19 shows the temperature and corresponding resonant frequency associated with the same for the duration of this test. The temperature reading here is the temperature of the thermocouple that's in close proximity to the sensor. As can be seen from FIG. 19, for the beginning of the test, the temperature remains constant and correspondingly the resonant frequency remains fairly constant. As soon as the temperature is ramped up, the resonant frequency correspondingly decreases following a similar slope as that of the temperature. The microturbine then steadies out in RPM for a short duration resulting in a slight drop in temperature, correspondingly increasing the resonant frequency for that duration. Towards the end right after steadying out, there is a sudden increase in temperature which leads to a corresponding decrease in resonant frequency. Thus, from the first test, the sensor shows good response which follows the quick, transient changes in temperature experienced during ramping up of the micro-turbine. The maximum temperature during this test was ~450° C. After the ramping-up test, the second run was a test with an extended ramp-up and cool-down period. The cool-down period here refers to the shutting of the microturbine after a rapid ramp-up. Data was recorded during both these phases. The response of the sensor during the cool-down period after ramping up is of particular importance since it allows us to check for the effect of hysteresis.

Figure 20:
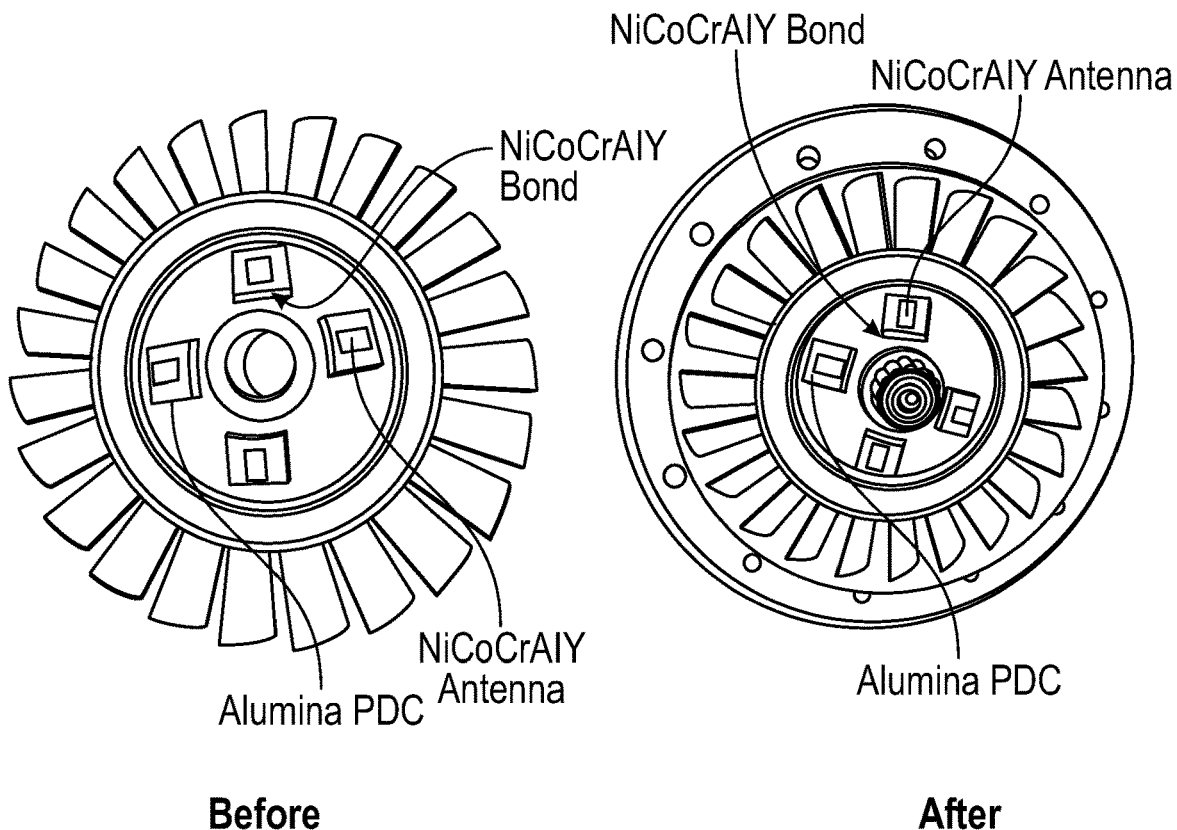
FIG. 20 shows thermally sprayed sensors deposited on an inner wheel of a turbine blade in accordance with an embodiment of the invention.

The microturbine used for this approach was the SW140B by CRX turbines. The bond coat that showed the most promise from the bonding trials i.e Oerlikon Metco's Amdry 365-2 was also sprayed as part of this approach. This bonding material is based on a NiCoCrAlY alloy which is used to ensure high temperature adhesion of TBC coatings on gas turbine blades. These were then exposed to full-throttle conditions of the microturbine up to 127,000 RPM and temperatures of up to 820° C. Embodiments of the invention include embedding or bonding wireless sensors 711 on to turbine components such as gas turbine blades 753 or gas turbine wheels or rotors 755. A new approach of thermally spraying alumina sensors directly on turbine surface is disclosed. In an embodiment, a microturbine is used for this approach such as the SW140B by CRX turbines. The bond coat that showed Oerlikon Metco's Amdry 365-2 can sprayed as part of this approach. This bonding material is based on a NiCoCrAlY alloy can be used to ensure high temperature adhesion of TBC coatings on gas turbine blades. FIG. 20 shows the thermally sprayed sensors on the inner wheel of the turbine blade before and after subjecting them to a full-throttle run of the SW-140B microturbine.

Figure 21:
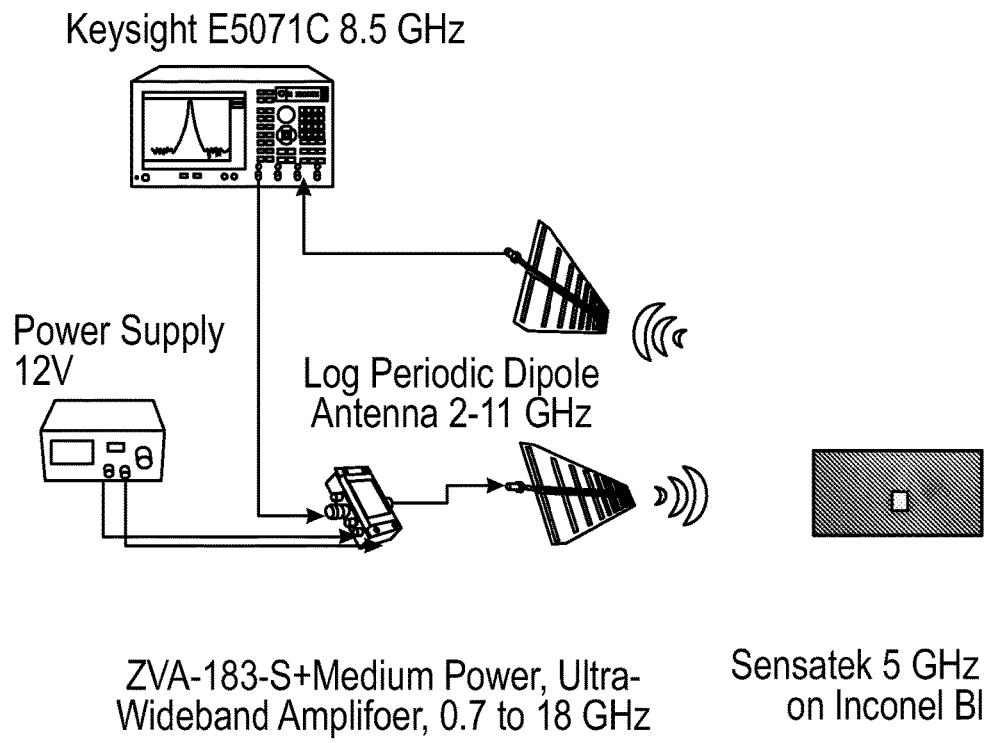
FIG. 21 shows a wireless transceiver circuit in accordance with an embodiment of the invention.

According to an embodiment, a wireless transceiver circuit was demonstrated using a gas turbine control system simulated with wireless sensor data and a prognostics tool for gas turbine blade health. Instrumentation does not compromise the quality of the wireless sensor data while interrogating wireless sensors on blade surfaces in an electromagnetic noisy environment, exasperated by the reflection of electromagnetic waves on rotating blades. FIG. 21 shows the design of wireless transceiver circuit. In an embodiment, the circuit is used to integrate wireless sensing technology into prognostic system of gas turbine engine.

Figure 22:
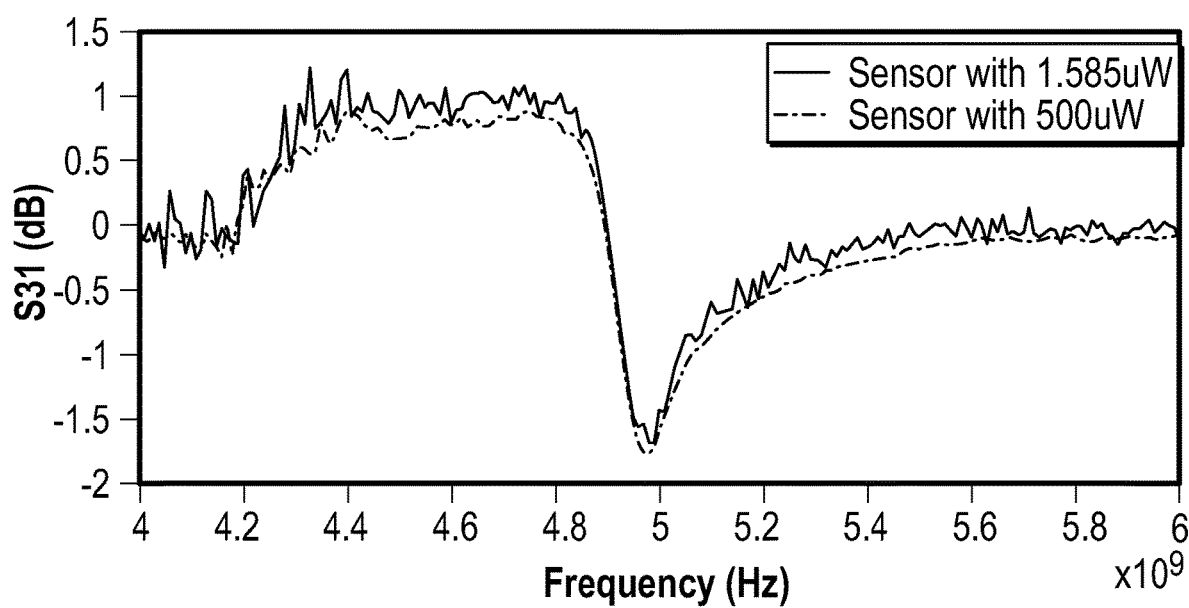
FIG. 22 shows results from the wireless transceiver circuit shown in FIG. 21.
Figure 23:
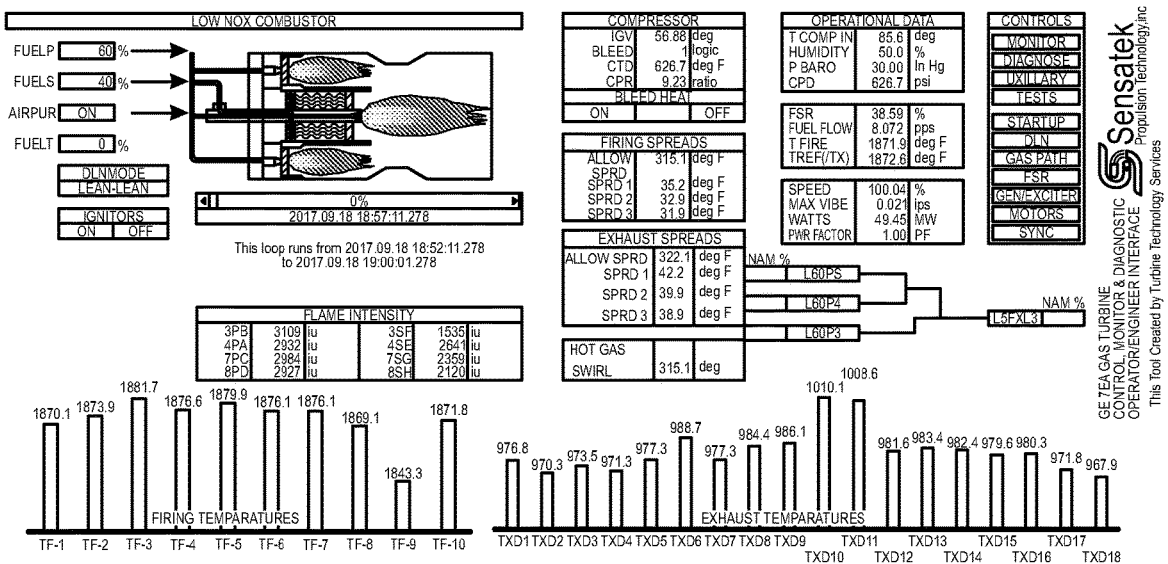
FIG. 23 shows a graphical user interface for a control system in accordance with an embodiment of the invention.

In an embodiment, the wireless transceiver circuit includes a Keysight E5071C 8.5 GHz, two log periodic dipole antennas (LPDA) with frequency range of 2-11 GHz, amplifer ZVA-183-S+ from Mini-circuits, which is a medium power, ultra-wideband amplifier range from 0.7 to 18 GHz, 12 V power supply for the amplifier and Sensatek's 5 GHz sensor attached to the Inconel blade. Keysight ENA Vector Network Analyzer's (VNA) port 1 and 3 are being used as the transmitter and receiver respectively. Port 1 is connected to the amplifier's input before the LPDA, then the amplifier's output is connected to the LPDA for sending the interrogation signal to Sensatek's sensor on the Inconel blade. The receiving LPDA is directly connected to port 3 for measuring the signal being re-radiated back from the sensor. A power supply is adjusted to 12 V output for providing the power to the amplifier by connecting the positive and negative pin to the right position on the amplifier. In an embodiment, when the amplifier is plugged between the port 1 and LPDA, 12 different power settings can be varied with the sensor at 8 cm distance to compare the difference. FIG. 22 reflects results at the lowest power setting of 1.585 µW (dashed and dotted green line in FIG. 22 to highest amplified power setting of 500 mW (blue line). It is clear that green dashed and dotted line is much smoother than the blue line. Thus, increasing the signal power 300,000 times does improve the quality of the signal. In an embodiment, wireless high temperature sensor data integration includes changing output of sensors from RF to millivolts. In an embodiment, the control system of the gas turbine engine includes a Programable Logic Control (PLC) that is able to read sensors output as a mV signal. In an embodiment, sensor data integration requirements include changing output of sensors from RF to millivolts. In an embodiment, the control system of the gas turbine engine requires that the Programable Logic Control (PLC) is able to read sensors output as a mV signal. Thus, integration of blade surface temperatures into gas turbine prognostic system can require a converter from AC to DC. In an embodiment, additional data points depict measured and calculated values from wireless high temperature sensors 711. A possible graphical user interface for a control system is shown in FIG. 23.

Figure 24:
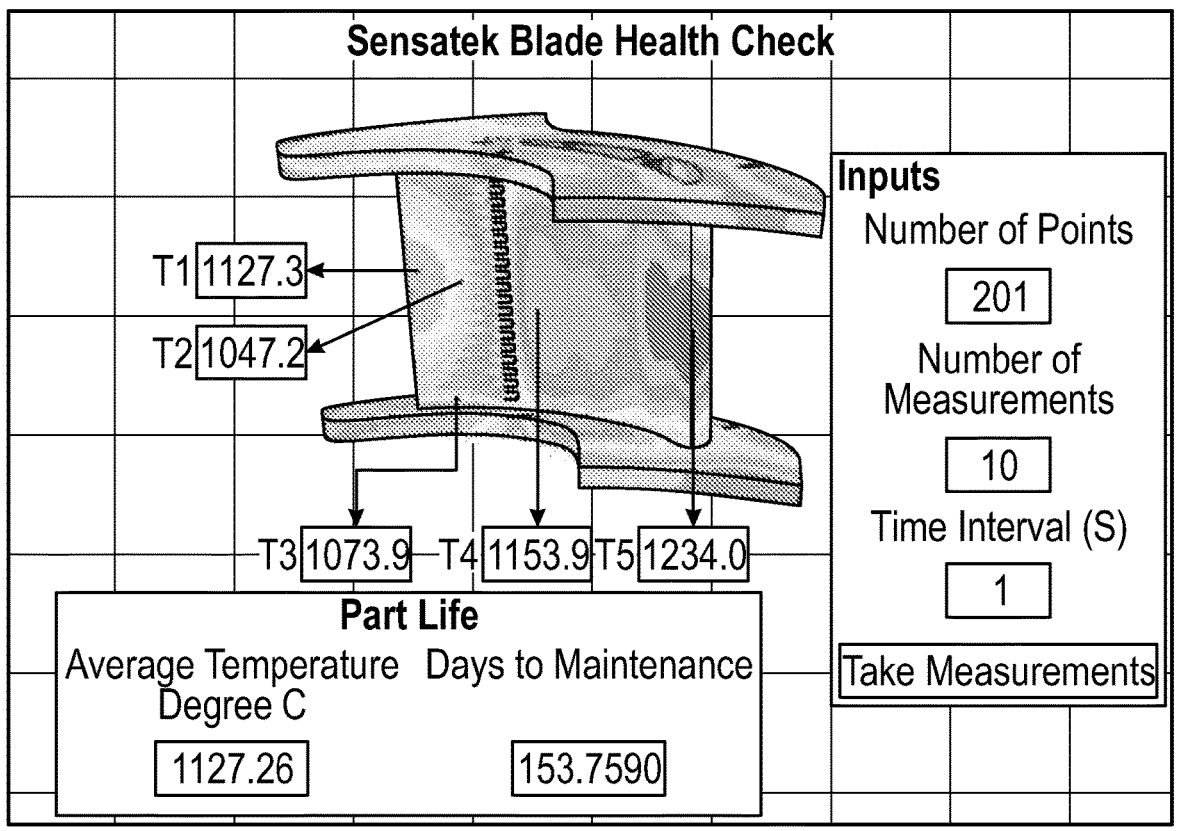
FIG. 24 shows a blade health prognostics tool in accordance with an embodiment of the invention.

A conventional human machine interface (HMI) screen format is used to show conventional data points and 10 temperature values that depict temperature inputs from sensors 711. In the interface show in FIG. 23, the temperature sensors depicted are embedded in the first stage nozzle leading edge and is used to measure hot gas temperatures from the center of each transition piece outlet. Calculated values for Average/Mean, Spread 1, Spread 2, and Spread 3 are displayed on the same screen view. A reasonable flame temperature ($T_f$) can be calculated to be used as the average temperature for a sensor array. In the illustration, we calculated $T_{ref}$ by using the exhaust gas temperatures. A reasonable temperature spread between transition piece outlets was composed and fixed into the data used for the simulation. The spread had a rough correlation to exhaust spread, but the actual direct measurement of $T_f$ is more accurate than conventional swirl calculations and we demonstrated this in the simulated data by conducting parametric variations of the swirl. The simulation of wireless sensors into prognostic system reveals direct measurements of actual firing temperature for each turbine nozzle, in a cannular, or annular chamber configuration. Actual firing temperature can point maintenance engineers to root causes of troublesome combustors. Enabling them to remedy temperature and emission spreads, and to run with smaller margins to design temperature limits. In embodiments, benefits of this direct measurement may include improving average turbine output by 0.5%, improving emissions by 0.7 ppm nitrogen oxide and extending maintenance service intervals by 40%. In an embodiment, a blade health prognostics tool can be provided as shown in FIG. 24. This tool can be automated to take measurements at any given time, it displays the temperature measured by multiple sensors and using the LM model of creep-rupture prediction as described earlier, gives information on the remaining useful life of the blade.

Figure 25:
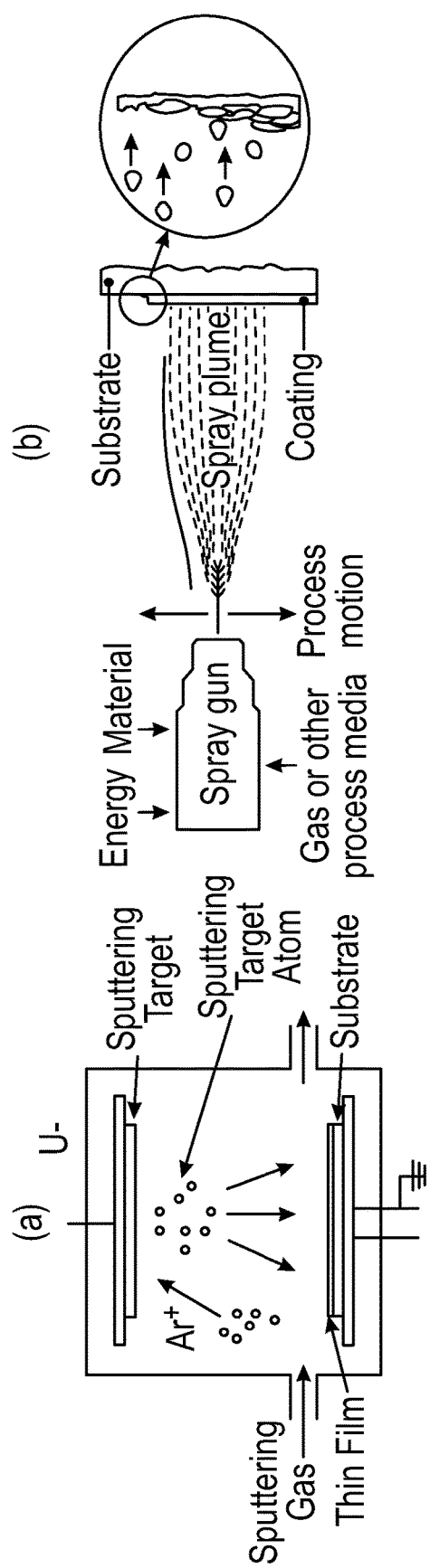
FIG. 25 shows methods of fabricating sensors by depositing material onto Inconel coupons in accordance with an embodiment of the invention.
Figure 26:
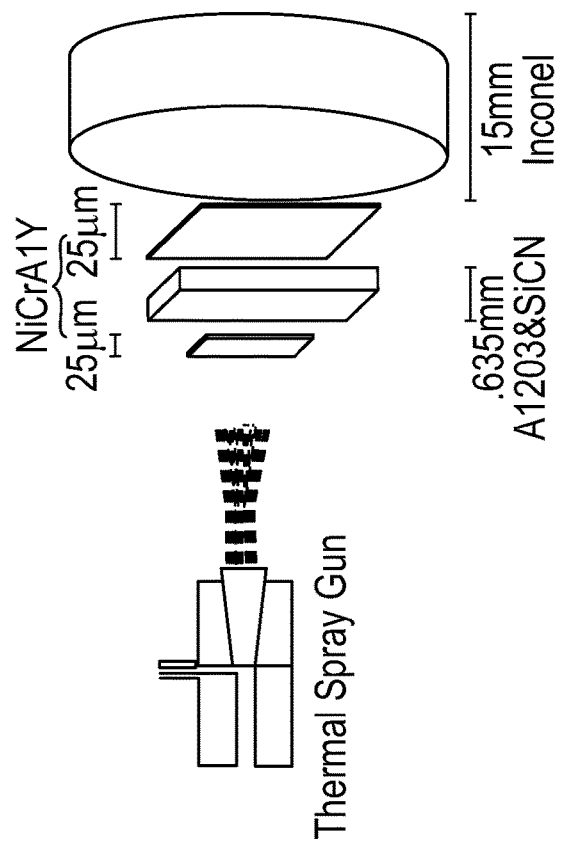
FIG. 26 shows architecture of a wireless sensor in accordance with an embodiment of the invention.

Processes for fabricating sensors 711 by depositing the sensing material onto Inconel coupons include a physical vapor deposition (PVD) process shown in FIG. 25(a), a thermal spraying process as shown in FIG. 25(b), and ceramic ball milling processes. In embodiments, the thermal spraying process shown in FIG. 25(b) provides a cost effective method of producing wireless sensors 711 and bonding mechanism to attach sensors directly to Inconel metallic surfaces. In an embodiment, a thermal flame spray process is utilized to deposit sensor metallic components (NiCrAlY), PDC substrates (Al2O3, and SiCN), and bonding solution (NiCrAlY) directly to an Inconel metallic surface. FIG. 26 depicts the material architecture of the wireless high temperature sensor 711 manufactured by the thermal spraying process of FIG. 25(b). Each material can be masked and sprayed separately to the Inconel substrate. In an embodiment, the NiCrAlY coat is electrically conductive and serves as both the bond coat of the sensor to the Inconel substrate and as the ground plane of the micro-patch antenna. FIG. 26 also depicts the order and size of the materials that will be thermally sprayed to Inconel substrate according to an embodiment of the invention. Yttrium-Stablized Zirconia (YSZ) may be utilized to address the thermal expansion mismatch between the ceramic and the Inconel. YSZ has a high thermal-expansion coefficient ($11\times 10\text{-}6°$ C.-1), which helps alleviate stresses arising from the thermal expansion mismatch. [Padture, 2002] In an embodiment, temperature protective coatings are applied on gas turbine blades 753 using the thermal spraying technique as shown in FIG. 25(b). In an embodiment, such materials are deposited directly on gas turbine Inconel (non-ceramic coated) blades. In an embodiment, PDC materials are deposited directly on to metallic high temperature bond coat. In an embodiment, the PVD process shown in FIG. 25(a) is used to deposit thin film nickel components on a Al2O3 surfaces. In an embodiment, a mask is used for flame spraying NiCrAlY bond on to 15 mm Inconel metallic 3-inch wafer disc. In embodiment, a mask is used for flame spraying PDC material Al2O3, and SiCN, to a surface of thermally sprayed bond coat. In an embodiment, a mask is used to assist thermally spraying wireless sensing components of conductive element NiCrAlY to surface of thermally sprayed PDCs. In an embodiment, the PVD process includes creating a mask for alumina substrate that is used to sputter Nickel inside the PVD chamber, using Nickel target. In an embodiment, Nickel is sputtered on to the alumina substrate to create the ground plane and the metallic components of the reflective patch antenna of the sensor 711. In an embodiment, the Nickel (target) is vaporized from a solid source assisted by high temperature vacuum and/or gaseous plasma, where the Nickel was transported via nickel vapor in vacuum or partial vacuum to the alumina substrate surface. In an embodiment, condensation was generated onto the ceramic substrate to generate thin films of metallic sensing elements. Sputtering is a plasma-assisted technique used to creates a vapor from the Nickel target through bombardment with accelerated gaseous Argon ions.

The above embodiments are illustrative of the present invention. It is neither necessary, nor intended for this patent to outline or define every possible combination or embodiment. The inventor has disclosed sufficient information to permit one skilled in the art to practice at least one embodiment of the invention. The above description and drawings are merely illustrative of the present invention and that changes in components, structure and procedure are possible without departing from the scope of the present invention as defined in the following claims. For example, elements and/or steps described above and/or in the following claims in a particular order may be practiced in a different order without departing from the invention. Thus, while the invention has been particularly shown and described with reference to embodiments thereof, it will be understood by those skilled in the art that various changes in form and details may be made therein without departing from the spirit and scope of the invention.

What is claimed is:

1. A system for wirelessly monitoring temperatures of a gas turbine engine, comprising:
   a wireless sensor deposited on a surface of a component of the gas turbine engine, the wireless sensor comprises:
      a bond coat deposited on the surface of the component, the bond coat provides a ground plane for the wireless sensor,
      a polymer derived ceramic layer deposited on the bond coat, and
      a patch antenna deposited on the polymer derived ceramic layer;
   one or more interrogating antennas configured to transmit an RF signal to the wireless sensor and receive an RF return signal from the wireless sensor; and
   a processing unit configured to interpret the RF return signal to determine a plurality of temperatures of the component of the gas turbine engine.

2. The system of claim 1, wherein the surface is an Inconel surface of the gas turbine engine.

3. The system of claim 1, wherein the patch antenna comprises an MCrAl[Ta, Hf, Si]Y coating, wherein M is a material selected from the group consisting of Fe, Co, or Ni.

4. The system of claim 3, wherein the bond coat comprises a second MCrAl[Ta, Hf, Si]Y coating.

5. The system of claim 1, wherein the patch antenna comprises a material selected from the group consisting of platinum, nickel, copper, gold, palladium, silver, tungsten, titanium, or tantalum.

6. The system of claim 1, wherein the polymer derived ceramic layer comprises a material selected from the group consisting of Alumina, Silicon carbide nitride, Titania, Zirconia, YSZ, or Silicon Carbide.

7. The system of claim 1, wherein the wireless sensor further comprises a ceramic matrix composite.

8. The system of claim 7, wherein the ceramic matrix composite is embedded in the component of the gas turbine engine.

9. The system of claim 7, wherein the ceramic matrix composite is bonded on the component of the gas turbine engine.

10. The system of claim 1, wherein the wireless sensor is deposited on the component of the gas turbine engine using a process selected from the group consisting of a physical vapor deposition process, a thermal spraying process, or a ceramic ball milling process.

11. The system of claim 1, wherein the wireless sensor is deposited on the component of the gas turbine engine using a thermal spraying process comprising depositing metallic components, PDC substrates, and bonding solution directly to an Inconel metallic surface of the component of the gas turbine engine.

12. The system of claim 1, wherein the component of the gas turbine engine is a blade and the wireless sensor is installed under a thermal barrier coating of the blade.

13. A method of manufacturing a wireless sensor for wirelessly monitoring temperatures of a gas turbine engine, comprising:

depositing a bonding solution directly to a surface of a component of the gas turbine engine;
    forming a bond coat with a ground plane for the wireless sensor using the bonding solution;
    depositing a PDC substrate on top of the bond coat; and
    depositing a metallic component having a patch antenna on top of the PDC substrate.

14. The method of claim 13, wherein the bonding solution comprises NiCrAlY.

15. The method of claim 13, wherein the PDC substrate comprises Al2O3, and SiCN.

16. The method of claim 13, wherein the metallic component comprises NiCrAlY.

17. The method of claim 13, wherein the surface of the component is an Inconel metallic surface.

18. The method of claim 13, wherein one or more of the depositing of the bonding solution, depositing of the PDC substrate and the depositing of the metallic component includes using a thermal spraying process.

\* \* \* \* \*